(12) United States Patent
Ravimohan et al.

(10) Patent No.: US 11,036,411 B2
(45) Date of Patent: Jun. 15, 2021

(54) YIELD IMPROVEMENT THROUGH BLOCK BUDGET OPTIMIZATION BY USING A TRANSIENT POOL OF MULTI-LEVEL BLOCKS

(71) Applicant: Western Digital Technologies, Inc., San Jose, CA (US)

(72) Inventors: Narendhiran Chinnaanangur Ravimohan, Bangalore (IN); Muralitharan Jayaraman, Bangalore (IN); Arun Thandapani, Bangalore (IN); Ramkumar Ramamurthy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 100 days.

(21) Appl. No.: 16/449,728

(22) Filed: Jun. 24, 2019

(65) Prior Publication Data

US 2020/0401332 A1  Dec. 24, 2020

(51) Int. Cl.
*G06F 12/00* (2006.01)
*G06F 3/06* (2006.01)

(52) U.S. Cl.
CPC .......... *G06F 3/0634* (2013.01); *G06F 3/0604* (2013.01); *G06F 3/064* (2013.01); *G06F 3/0653* (2013.01); *G06F 3/0659* (2013.01); *G06F 3/0679* (2013.01)

(58) Field of Classification Search
CPC ............. G11C 11/5628; G11C 16/3495; G06F 12/0246
See application file for complete search history.

(56) References Cited

U.S. PATENT DOCUMENTS

| 8,225,067 B2 | 7/2012 | Chu et al. |
| 9,021,177 B2 | 4/2015 | Segal et al. |
| 9,298,603 B2 | 3/2016 | Schuette |
| 10,255,000 B2 | 4/2019 | Sharma et al. |
| 2009/0327590 A1* | 12/2009 | Moshayedi ........... G06F 3/0613 711/103 |

(Continued)

OTHER PUBLICATIONS

Lee, Sungjin, et al., "FlexFS: A Flexible Flash File System for MLC NAND Flash Memory," USENIX'09 Proceedings of the 2009 conference on USENIX Annual technical conference, Jun. 2009, 14 pages.

(Continued)

*Primary Examiner* — Ryan Bertram
*Assistant Examiner* — Trang K Ta
(74) *Attorney, Agent, or Firm* — Vierra Magen Marcus LLP

(57) ABSTRACT

Apparatuses and techniques are described for more efficiently allocating blocks of data in a memory device. The number of dedicated single-level cell (SLC) blocks which are allocated at the time of manufacture of a memory device can be reduced by transitioning a portion of the multi-level cell (MLC) blocks to an SLC mode at various times in the lifetime of the memory device. In one approach, separate counts are maintained for an MLC block in the SLC and MLC modes. The separate counts can be used to select an MLC block to transition to the SLC mode, or to select an MLC block to program. In another approach, a single count is maintained, where the SLC cycles are weighted less heavily than the MLC cycles.

19 Claims, 13 Drawing Sheets

(56) References Cited

U.S. PATENT DOCUMENTS

| | | | |
|---|---|---|---|
| 2011/0055458 A1* | 3/2011 | Kuehne | G06F 12/0246 |
| | | | 711/103 |
| 2011/0252187 A1 | 10/2011 | Segal et al. | |
| 2011/0271043 A1* | 11/2011 | Segal | G06F 12/0246 |
| | | | 711/103 |
| 2013/0138870 A1* | 5/2013 | Yoon | G11C 16/3495 |
| | | | 711/103 |
| 2019/0034330 A1* | 1/2019 | Natarajan | G11C 11/5628 |

OTHER PUBLICATIONS

Jimenez, Xavier, et al., "Software Controlled Cell Bit-Density to Improve NAND Flash Lifetime," ResearchGate, Jun. 2012, 7 pages.

\* cited by examiner

| Example 1 – block budget | | | |
|---|---|---|---|
| Pool | #blocks | Memory endurance | Product endurance |
| SLC | 115 | 100k | n/a |
| MLC capacity | 1283 | 5k | 3k |
| Other MLC blocks | 41 | | |
| Bad block limit | 39 | | |

| Example 2 – block budget | | | |
|---|---|---|---|
| Pool | #blocks | Memory endurance | Product endurance |
| SLC | 67 | 100k | n/a |
| MLC capacity | 1283 | 5k | 3k |
| Transient MLC-SLC | 2 | | |
| Other MLC blocks | 41 | | |
| Bad block limit | 85 | | |

| Table of multi-mode block status | | |
|---|---|---|
| Block# | Bit/Type (SLC=0, MLC=1) | Retire (no=0, yes=1) |
| 0 | 0 | 0 |
| 1 | 0 | 0 |
| 2 | 1 | 0 |
| 3 | 1 | 0 |
| 4 | 1 | 0 |
| . | | |
| 1283 | 0 | 0 |

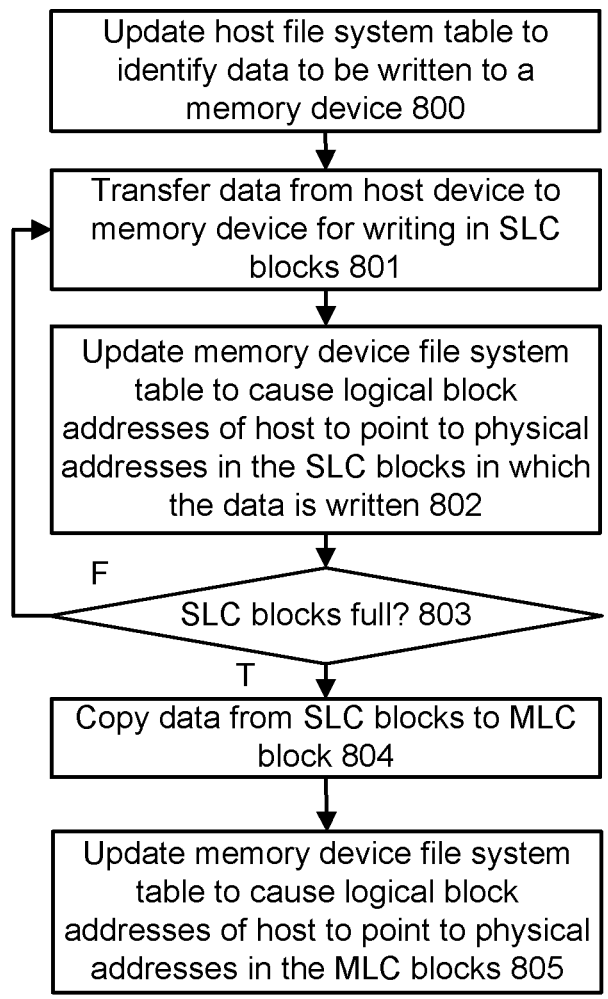

Fig. 8C

| | Memory device file system table 711 | |
|---|---|---|
| Logical address | SLC physical address | MLC physical address |
| 0 | block 0, page 0 | n/a |
| 1 | block 0, page 1 | n/a |
| 2 | block 0, page 2 | n/a |
| 3 | block 1, page 0 | n/a |
| 4 | block 1, page 1 | n/a |
| 5 | block 1, page 2 | n/a |
| 6 | block 2, page 0 | n/a |
| 7 | block 2, page 1 | n/a |
| 8 | block 2, page 2 | n/a |

Fig. 8D

| | Memory device file system table 711 | |
|---|---|---|
| Logical address | SLC physical address | MLC physical address |
| 0 | n/a | block 3, page 0 |
| 1 | n/a | block 3, page 1 |
| 2 | n/a | block 3, page 2 |
| 3 | n/a | block 3, page 3 |
| 4 | n/a | block 3, page 4 |
| 5 | n/a | block 3, page 5 |
| 6 | n/a | block 3, page 6 |
| 7 | n/a | block 3, page 7 |
| 8 | n/a | block 3, page 8 |

Fig. 8E

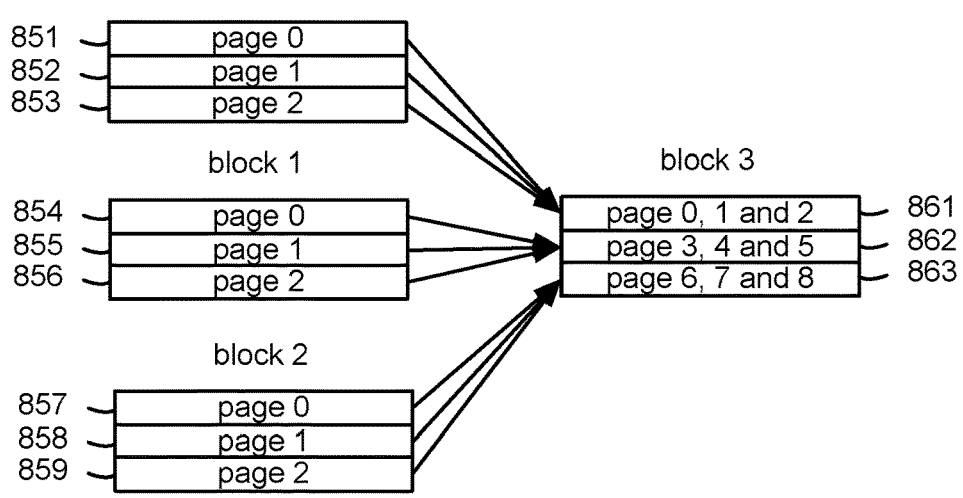

YIELD IMPROVEMENT THROUGH BLOCK BUDGET OPTIMIZATION BY USING A TRANSIENT POOL OF MULTI-LEVEL BLOCKS

BACKGROUND

The present technology relates to the operation of storage and memory devices.

Semiconductor memory devices have become more popular for use in various electronic devices. For example, non-volatile semiconductor memory is used in cellular telephones, digital cameras, personal digital assistants, mobile computing devices, non-mobile computing devices and other devices.

A charge-storing material such as a floating gate or a charge-trapping material can be used in such memory devices to store a charge which represents a data state. A charge-trapping material can be arranged vertically in a three-dimensional (3D) stacked memory structure, or horizontally in a two-dimensional (2D) memory structure. One example of a 3D memory structure is the Bit Cost Scalable (BiCS) architecture which comprises a stack of alternating conductive and dielectric layers.

A memory device includes memory cells which may be arranged in series, in NAND strings (e.g., NAND chains), for instance, where select gate transistors are provided at the ends of a NAND string to selectively connect a channel of the NAND string to a source line or bit line. However, various challenges are presented in operating such memory devices.

BRIEF DESCRIPTION OF THE DRAWINGS

FIG. 8A depicts an example process for programming data to SLC blocks in the pool 721 or 723 of FIG. 7A, then copying the data to MLC blocks in the pool 722.

FIG. 8B depicts the example host file system table 701 of FIG. 7A which is updated consistent with step 800 of FIG. 8A.

FIG. 8C depicts the example memory device file system table 711 of FIG. 7A which is updated consistent with step 802 of FIG. 8A.

FIG. 8D depicts the example memory device file system table 711 of FIG. 7A which is updated consistent with step 805 of FIG. 8A.

FIG. 8E depicts an example of copying data from SLC blocks to an MLC block, consistent with FIG. 8A

DETAILED DESCRIPTION

Apparatuses and techniques are described for more efficiently allocating blocks of data in a memory device.

Figure 3:
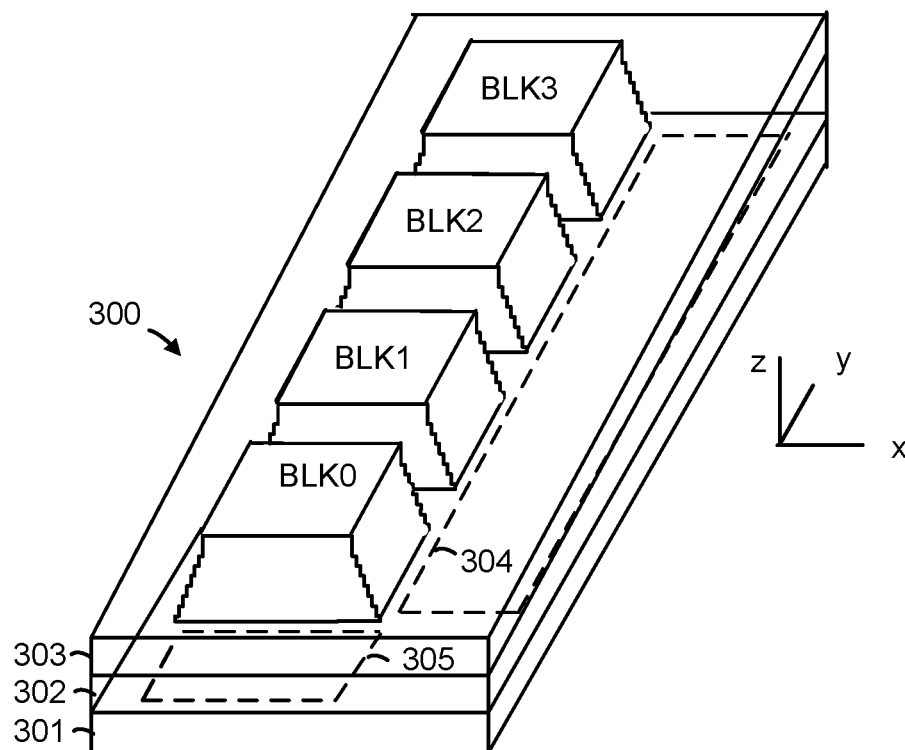
FIG. 3 is a perspective view of a memory device 500 comprising a set of blocks in an example 3D configuration of the memory structure 126 of FIG. 1.
Figure 5:
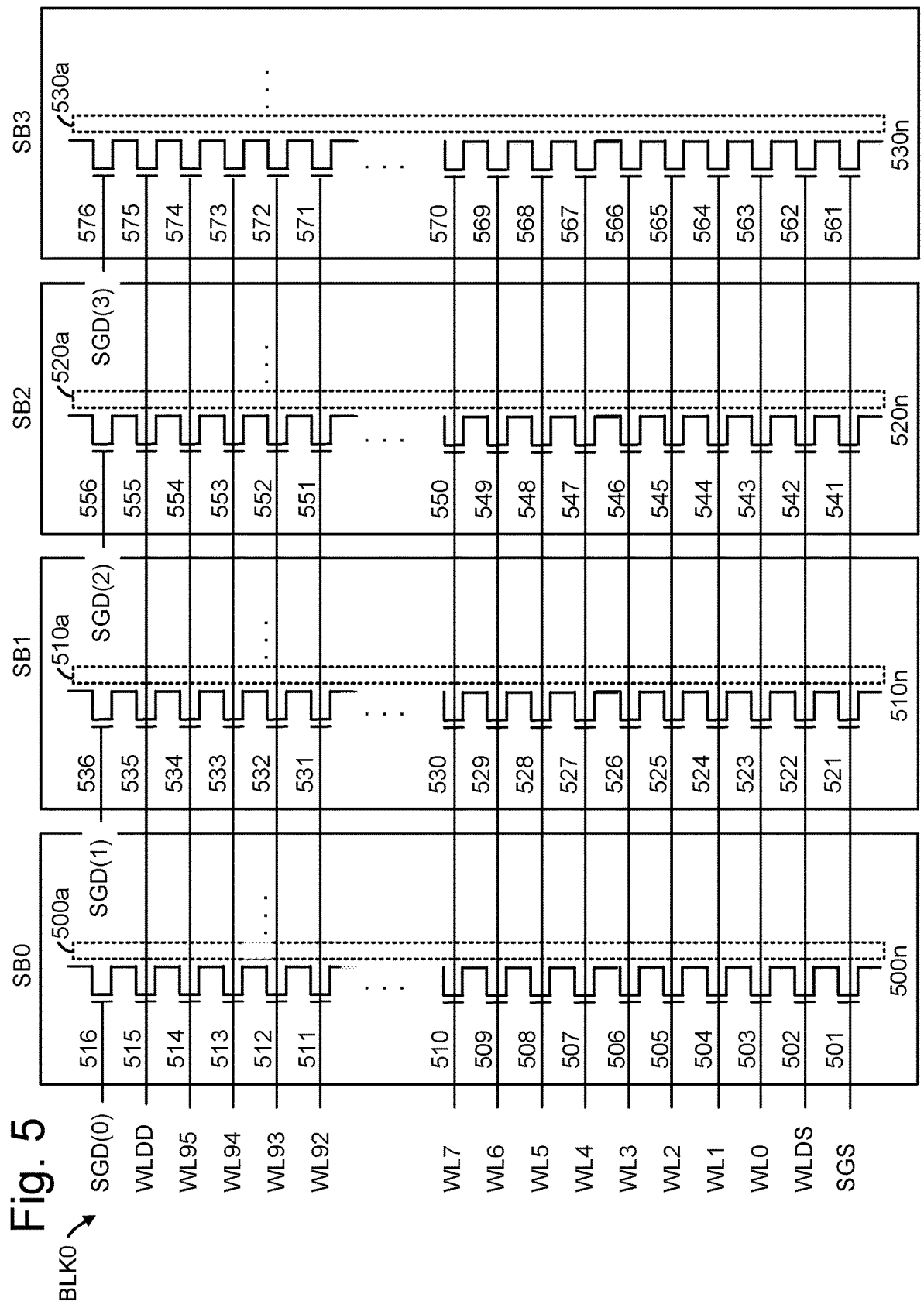
FIG. 5 depicts an example view of NAND strings in a block BLK0 which is consistent with FIG. 3.

In a memory device, memory cells can be arranged in blocks such as depicted in FIG. 3. The memory cells can be joined to one another, e.g., in NAND strings, such as depicted in FIG. 5. Further, the memory cells can be arranged in a 2D or 3D structure. In a 3D memory structure, the memory cells may be arranged in vertical NAND strings in a stack, where the stack comprises alternating conductive and dielectric layers. The conductive layers act as word lines which are connected to the memory cells. Each NAND string may have the shape of a pillar which intersects with the word lines to form the memory cells. In a 2D memory structure, the memory cells may be arranged in horizontal NAND strings on a substrate.

The memory cells in a block can be subject to program, read and erase operations. A programming operation may include one or more sets of increasing program voltages or pulses which are applied to a word line in respective program loops or program-verify iterations. Verify tests may be performed after each program voltage to determine whether the memory cells have completed programming. When programming is completed for a memory cell, it can be locked out from further programming while programming continues for other memory cells in subsequent program loops.

Figure 6A:
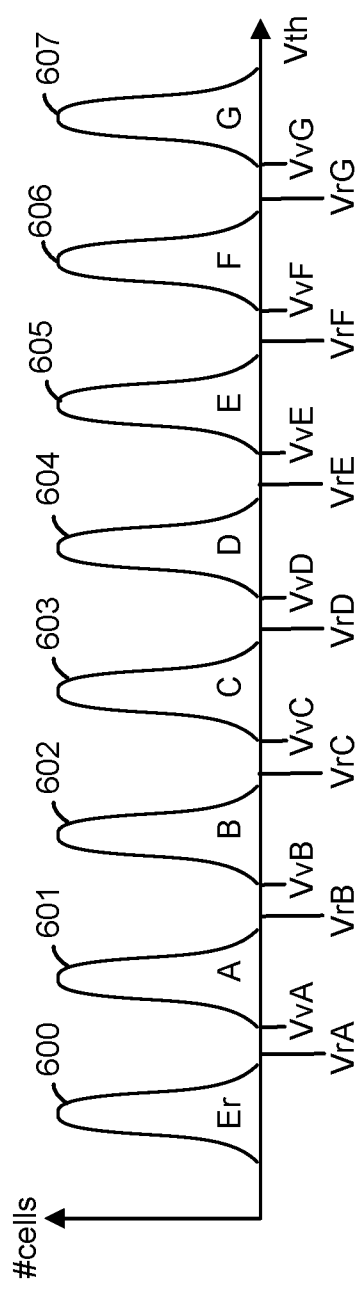
FIG. 6A depicts an example Vth distribution of memory cells, where eight data states are used in an example of MLC programming.
Figure 6B:
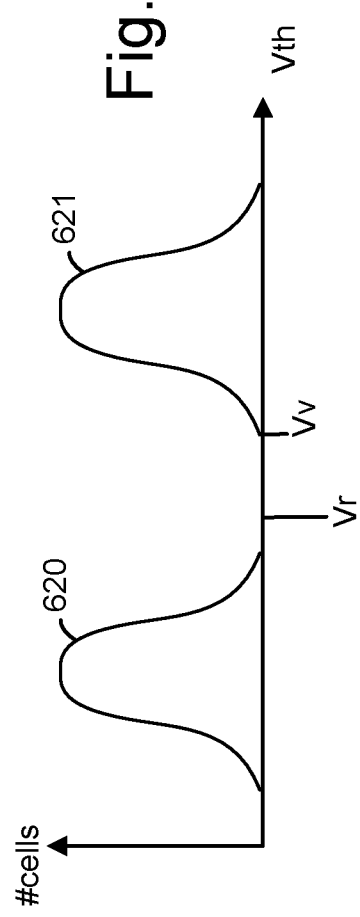
FIG. 6B depicts an example Vth distribution of memory cells, where two data states are used in SLC programming.

Each memory cell may be associated with a data state according to write data in a program command. Based on its data state, a memory cell will either remain in the erased (Er) state or be programmed to a programmed data state. For example, in a one bit per cell block, also referred to as a SLC (single level cell) block, there are two data states including the erased state and the programmed state, as depicted in FIG. 6B. In a two-bit per cell block, there are four data states including the erased state and three programmed data states referred to as the A, B and C data states. In a three-bit per cell block, there are eight data states including the erased state and seven programmed data states referred to as the A, B, C, D, E, F and G data states, as depicted in FIG. 6A. In a four-bit per cell block, there are sixteen data states including the erased state S0 and fifteen programmed data states S1-S15. Each data state can be represented by a range of threshold voltages (Vth) in the memory cells. A block with two or more bits per cell is referred to as an MLC (multi-level cell) block.

After the memory cells are programmed, the data can be read back in a read operation. A read operation can involve applying a series of read voltages to a word line while sensing circuitry determines whether cells connected to the word line are in a conductive (turned on) or non-conductive (turned off) state. If a cell is in a non-conductive state, the Vth of the memory cell exceeds the read voltage. The read voltages are set at levels which are expected to be between the threshold voltage levels of adjacent data states. Moreover, during the read operation, the voltages of the unselected word lines are ramped up to a read pass level or turn on level which is high enough to place the unselected memory cells in a strongly conductive state, to avoid interfering with the sensing of the selected memory cells. A word line which is being programmed or read is referred to as a selected word line, WLn.

The various blocks in a memory device can be allocated between SLC and MLC blocks according to the intended application of the memory device. SLC blocks have a higher reliability and endurance while MLC blocks have a higher data density but lower endurance. SLC blocks can be used, e.g., as control blocks, which typically require high reliability, or random data blocks or backup blocks, which typically require high endurance. MLC blocks are used primarily as capacity blocks, e.g., blocks which provide the primary long-term storage capacity of the memory device.

The MLC blocks are allocated to achieve a desired storage capacity. However, the requirement to provide a specified number of SLC blocks with a specified endurance, along with the loss of blocks which are determined to be bad at the time of manufacture, is problematic. For products with high product endurance requirements, the maximum number of bad blocks is limited by the SLC endurance. For example, in systems that support highly random write cycling or have to support a data snapshot or a 100% data backup to counter defects, the number of SLC blocks allocated is relatively high and limits the number of blocks which can be allocated to the MLC mode. One example of such a system is an automotive storage device product.

Techniques provided herein address the above and other issues. In one approach, the number of dedicated SLC blocks which are allocated at the time of manufacture of a memory device can be reduced by transitioning a portion of the MLC blocks to an SLC mode at various times in the lifetime of the memory device. Dedicated SLC blocks are blocks which operate in the SLC mode only throughout their lifetime. The program-erase (P-E) cycles of the MLC mode are therefore re-allocated to the SLC mode. Moreover, the re-allocation is controlled so that a uniform number of P-E cycles are re-allocated from each MLC block. This results in a deterministic reduction in the number of allocated SLC blocks.

Additionally, the P-E cycles of the MLC blocks while operating in the SLC mode are accounted for so that the endurance of the MLC blocks is not unnecessarily reduced. In one approach, separate counts are maintained for an MLC block in the SLC and MLC modes. The separate counts can be used to select an MLC block to transition to the SLC mode, or to select an MLC block to program. In another approach, a single count is maintained, where the SLC cycles are weighted less heavily than the MLC cycles. The techniques can be extended generally to M bit per cell blocks (which can include SLC blocks) and N bit per cell blocks (which include MLC blocks), where N and M are integers and N>M.

These and other features are discussed further below.

Figure 1:
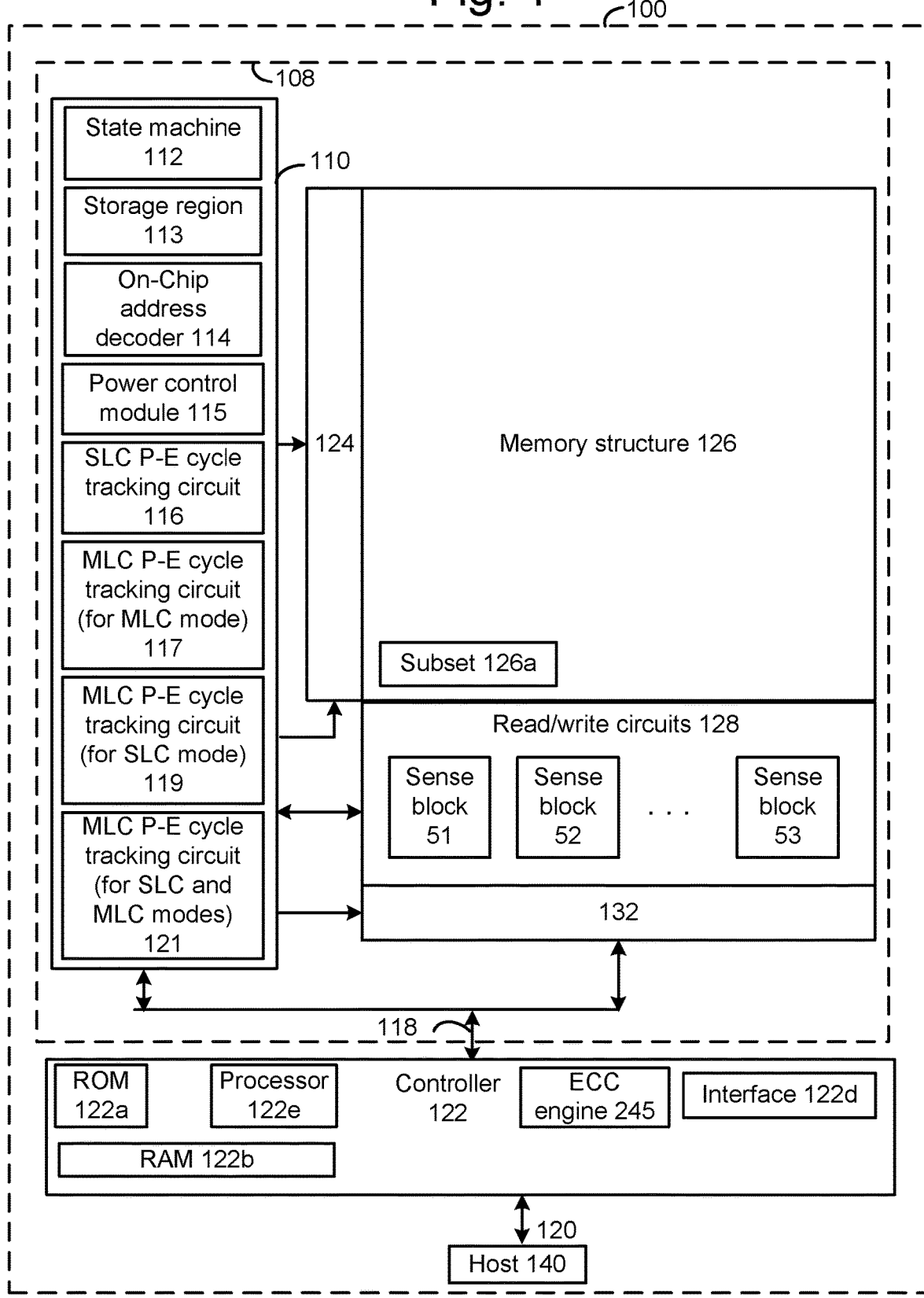
FIG. 1 is a block diagram of an example storage device.

FIG. 1 is a block diagram of an example storage device. The storage device 100, such as a non-volatile storage system, may include one or more memory die 108. The memory die 108, or chip, includes a memory structure 126 of memory cells, such as an array of memory cells, control circuitry 110, and read/write circuits 128. The memory structure 126 is addressable by word lines via a row decoder 124 and by bit lines via a column decoder 132. The read/write circuits 128 include multiple sense blocks 51, 52, . . . 53 (sensing circuitry) and allow a page of memory cells to be read or programmed in parallel. Typically a controller 122 is included in the same storage device 100 (e.g., a removable storage card) as the one or more memory die 108. The controller may be separate from the memory die. Commands and data are transferred between the host 140 and controller 122 via a data bus 120, and between the controller and the one or more memory die 108 via lines 118.

The memory structure can be 2D or 3D. The memory structure may comprise one or more array of memory cells including a 3D array. The memory structure may comprise a monolithic 3D memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

The control circuitry 110 cooperates with the read/write circuits 128 to perform memory operations on the memory structure 126, and includes a state machine, an on-chip address decoder 114, a power control module 115 (power control circuit), an SLC P-E cycle tracking circuit 116, an MLC P-E cycle tracking circuit (for MLC mode) 117, an MLC P-E cycle tracking circuit (for SLC mode) 119, and an MLC P-E cycle tracking circuit (for SLC and MLC modes) 119. A storage region 113 may be provided, e.g., for operational parameters and software/code. In one embodiment, the state machine is programmable by the software. In other embodiments, the state machine does not use software and is completely implemented in hardware (e.g., electrical circuits).

The on-chip address decoder 114 provides an address interface between that used by the host or a memory controller to the hardware address used by the decoders 124 and 132. The power control module 115 controls the power and voltages supplied to the word lines, select gate lines, bit lines and source lines during memory operations. It can include drivers for word lines, SGS and SGD transistors and source lines. The sense blocks can include bit line drivers, in one approach. The SLC P-E cycle tracking circuit 116 is provided for each dedicated SLC block. In one option, the MLC P-E cycle tracking circuit (for MLC mode) 117 and the MLC P-E cycle tracking circuit (for SLC mode) 119 are separate counters which are provided for each MLC block. In another option, the MLC P-E cycle tracking circuit (for SLC and MLC modes) 119 is a single counter which is provided for each MLC block.

In some implementations, some of the components can be combined. In various designs, one or more of the components (alone or in combination), other than memory structure 126, can be thought of as at least one control circuit which is configured to perform the techniques described herein including the steps of the processes described herein. For example, a control circuit may include any one of, or a combination of, control circuitry 110, state machine 112, decoders 114 and 132, power control module 115, tracking circuits 116, 117, 119 and 121, sense blocks 51, 52, . . . , 53, read/write circuits 128, controller 122, and so forth.

The off-chip controller 122 (which in one embodiment is an electrical circuit) may comprise a processor 122e, memory such as ROM 122a and RAM 122b and an error-correction code (ECC) engine 245. The ECC engine can correct a number of read errors. The RAM 122b can be a DRAM, for instance. A copy of data to be programmed is received from the host and stored temporarily in the RAM until the programming is successfully completed to blocks in the memory device. The RAM may store one or more word lines of data. In one approach, as discussed further in connection with FIG. 8A, the data is first stored in SLC blocks (e.g., dedicated SLC blocks or MLC blocks operating in SLC mode) and then transferred to MLC blocks operating MLC mode. The write time of the host device is minimized by first storing the data in the SLC blocks which can be written in less time than MLC blocks operating MLC mode.

A memory interface 122d may also be provided. The memory interface, in communication with ROM, RAM and processor, is an electrical circuit that provides an electrical interface between controller and memory die. For example, the memory interface can change the format or timing of signals, provide a buffer, isolate from surges, latch I/O and so forth. The processor can issue commands to the control circuitry 110 (or any other component of the memory die) via the memory interface 122d.

The memory in the controller 122, such as such as ROM 122a and RAM 122b, comprises code such as a set of instructions, and the processor is operable to execute the set of instructions to provide the functionality described herein. Alternatively or additionally, the processor can access code from a subset 126a of the memory structure 126, such as a reserved area of memory cells in one or more word lines.

For example, code can be used by the controller to access the memory structure such as for programming, read and erase operations. The code can include boot code and control code (e.g., a set of instructions). The boot code is software that initializes the controller during a booting or startup process and enables the controller to access the memory structure. The code can be used by the controller to control one or more memory structures. Upon being powered up, the processor 122e fetches the boot code from the ROM 122a or the subset 126a of the memory structure for execution, and the boot code initializes the system components and loads the control code into the RAM 122b. Once the control code is loaded into the RAM, it is executed by the processor. The control code includes drivers to perform basic tasks such as controlling and allocating memory, prioritizing the processing of instructions, and controlling input and output ports.

Generally, the control code can include instructions to perform the functions described herein including the steps of the flowcharts discussed further below, and provide the voltage waveforms including those discussed further below. A control circuit can be configured to execute the instructions to perform the functions described herein.

In one embodiment, the host is a computing device (e.g., laptop, desktop, smartphone, tablet, digital camera) that includes one or more processors, one or more processor readable memory devices (RAM, ROM, flash memory, hard disk drive, solid-state memory) that store processor readable code (e.g., software) for programming the one or more processors to perform the methods described herein. The host may also include additional system memory, one or more input/output interfaces and/or one or more input/output devices in communication with the one or more processors.

Other types of non-volatile memory in addition to NAND flash memory can also be used.

Semiconductor memory devices include volatile memory devices, such as dynamic random access memory (DRAM) or static random access memory (SRAM) devices, non-volatile memory devices, such as resistive random access memory (ReRAM), electrically erasable programmable read-only memory (EEPROM), flash memory (which can also be considered a subset of EEPROM), ferroelectric random access memory (FRAM), and magnetoresistive random access memory (MRAM), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and SG transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a 2D memory structure or a 3D memory structure.

In a 2D memory structure, the semiconductor memory elements are arranged in a single plane or a single memory device level. Typically, in a 2D memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A 3D memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements. The columns may be arranged in a 2D configuration, e.g., in an x-y plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

2D arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this technology is not limited to the 2D and 3D exemplary structures described but covers all relevant memory structures within the spirit and scope of the technology as described herein and as understood by one of skill in the art.

Figure 2:
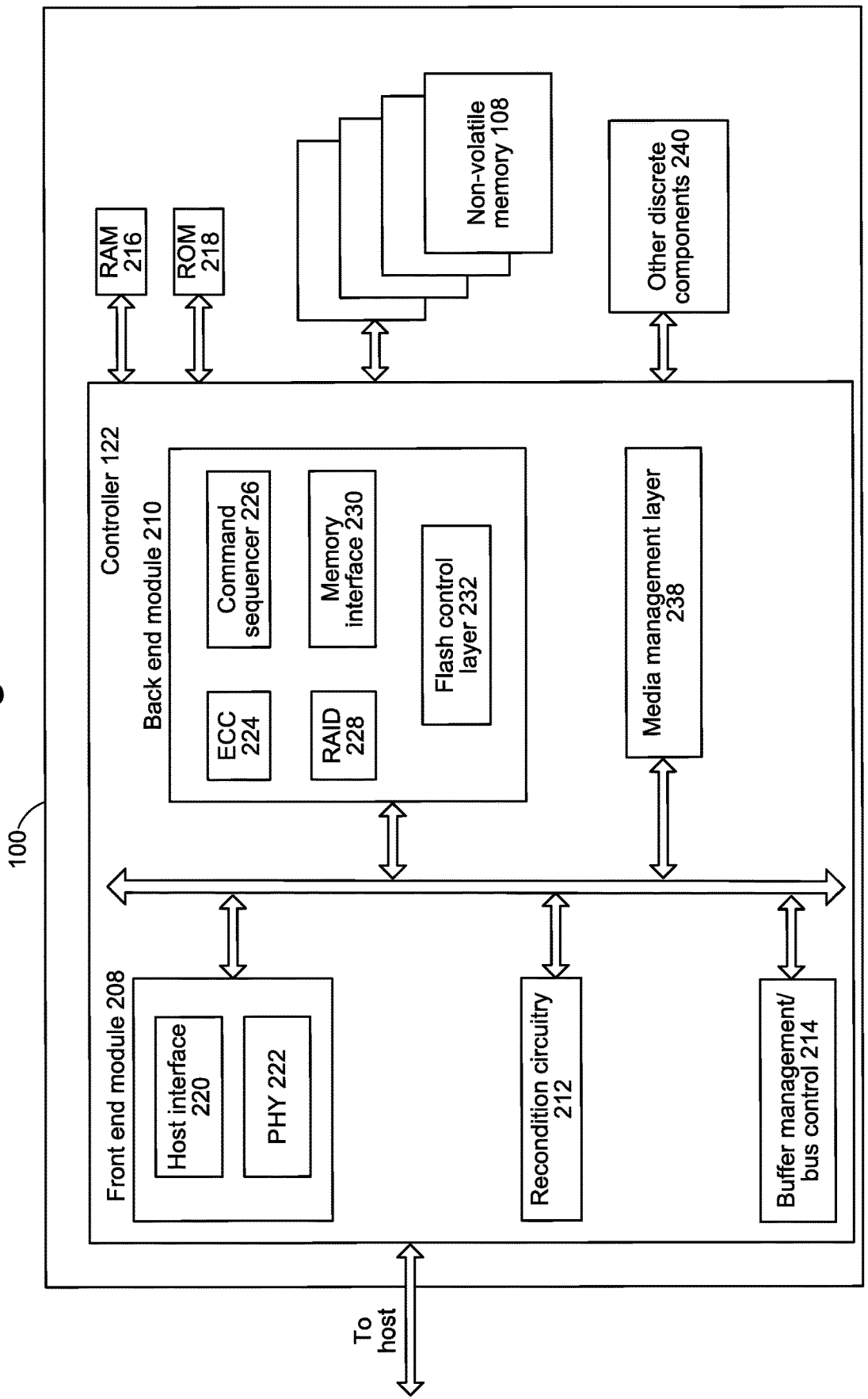
FIG. 2 is a block diagram of the example storage device 100 of FIG. 1, depicting additional details of the controller 122.

FIG. 2 is a block diagram of the example storage device 100 of FIG. 1, depicting additional details of the controller 122. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 122 and non-volatile memory die 108 may be any suitable flash interface. In one embodiment, the storage device 100 may be a card based system, such as a secure digital (SD) or a micro secure digital (micro-SD) card. In an alternate embodiment, the memory system may be part of an embedded memory system. For example, the flash memory may be embedded within the host, such as in the form of a solid-state disk (SSD) drive installed in a personal computer.

In some embodiments, the storage device 100 includes a single channel between the controller 122 and the non-volatile memory die 108, the subject matter described herein is not limited to having a single memory channel.

The controller 122 includes a front end module 208 that interfaces with a host, a back end module 210 that interfaces with the one or more non-volatile memory die 108, and various other modules that perform functions which will now be described in detail.

The components of the controller may take the form of a packaged functional hardware unit (e.g., an electrical circuit) designed for use with other components, a portion of a program code (e.g., software or firmware) executable by a processor, e.g., microprocessor, or processing circuitry that usually performs a particular function of related functions, or a self-contained hardware or software component that interfaces with a larger system, for example. For example, each module may include an Application Specific Integrated Circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor for the controller to perform the functions described herein. The architecture depicted in FIG. 2 is one example implementation that may (or may not) use the components of the controller 122 depicted in FIG. 1 (e.g., RAM, ROM, processor, interface).

The controller 122 may include recondition circuitry 212, which is used for reconditioning memory cells or blocks of memory. The reconditioning may include refreshing data in its current location or reprogramming data into a new word line or block as part of performing erratic word line maintenance, as described below.

Referring again to modules of the controller 122, a buffer manager/bus controller 214 manages buffers in random access memory (RAM) 216 and controls the internal bus arbitration of Controller 122. The RAM may include DRAM and/or SRAM. DRAM or Dynamic Random Access Memory is a type of semiconductor memory in which the memory is stored in the form of a charge. Each memory cell in a DRAM is made of a transistor and a capacitor. The data is stored in the capacitor. Capacitors lose charge due to leakage and hence DRAMs are volatile devices. To keep the data in the memory, the device must be regularly refreshed. In contrast, SRAM or Static Random Access Memory will retain a value as long as power is supplied.

A read only memory (ROM) 218 stores system boot code. Although illustrated in FIG. 2 as being located separately from the controller, in other embodiments, one or both of the RAM 216 and ROM 218 may be located within the controller. In yet other embodiments, portions of RAM and ROM may be located both within the controller 122 and outside the controller. Further, in some implementations, the controller 122, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals.

Back end module 210 includes an error correction controller (ECC) engine 224 that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the storage device 100. In some cases, the RAID module 228 may be a part of the ECC engine 224. Note that the RAID parity may be added as an extra die or dies as implied by the common name, but it may also be added within the existing die, e.g. as an extra plane, or extra block, or extra word lines within a block. A memory interface 230 provides the command sequences to non-volatile memory die 108 and receives status information from the non-volatile memory die. A flash control layer 232 controls the overall operation of back end module 210.

Additional components of storage device 100 include media management layer 238, which performs wear leveling of memory cells of non-volatile memory die 108. The memory system also includes other discrete components 240, such as external electrical interfaces, external RAM, resistors, capacitors, or other components that may interface with Controller 122. In alternative embodiments, one or more of the physical layer interface 222, RAID module 228, media management layer 238 and buffer management/bus controller 214 are optional components that are not necessary in the Controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the memory structure 126, e.g., flash memory, of die 108. The FTL may implement the file system tables discussed further below. The MML 238 may be needed because: 1) the flash memory may have limited endurance; 2) the flash memory may only be written in multiples of pages; and/or 3) the flash memory may not be written unless it is erased as a block. The MML 238 understands these potential limitations of the flash memory which may not be visible to the host. Accordingly, the MML 238 attempts to translate the writes from host into writes into the flash memory. Erratic bits may be identified and recorded using the MML 238. This recording of erratic bits can be used for evaluating the health of blocks and/or word lines (the memory cells on the word lines).

The controller 122 may interface with one or more memory dies 108. In in one embodiment, the controller and multiple memory dies (together comprising the storage device 100) implement a solid-state drive (SSD), which can emulate, replace or be used instead of a hard disk drive inside a host, as a network-attached storage (NAS) device, and so forth. Additionally, the SSD need not be made to work as a hard drive.

FIG. 3 is a perspective view of a memory device 300 comprising a set of blocks in an example 3D configuration of the memory structure 126 of FIG. 1. On the substrate are example blocks BLK0, BLK1, BLK2 and BLK3 of memory cells (storage elements) and peripheral areas with circuitry for use by the blocks. The peripheral area 304 runs along an edge of each block while the peripheral area 305 is at an end of the set of blocks. The circuitry can include voltage drivers which can be connected to control gate layers, bit lines and source lines of the blocks. In one approach, control gate layers at a common height in the blocks are commonly driven. The substrate 301 can also carry circuitry under the blocks, and one or more lower metal layers which are patterned in conductive paths to carry signals of the circuitry. The blocks are formed in an intermediate region 302 of the memory device. In an upper region 303 of the memory device, one or more upper metal layers are patterned in conductive paths to carry signals of the circuitry. Each block comprises a stacked area of memory cells, where alternating levels of the stack represent word lines. In one possible approach, each block has opposing tiered sides from which vertical contacts extend upward to an upper metal layer to form connections to conductive paths. While four blocks are depicted as an example, two or more blocks can be used, extending in the x- and/or y-directions.

In one possible approach, the blocks are in a plane, and the length of the plane, in the x-direction, represents a direction in which signal paths to word lines extend in the one or more upper metal layers (a word line or SGD line direction), and the width of the plane, in the y-direction, represents a direction in which signal paths to bit lines extend in the one or more upper metal layers (a bit line direction). The z-direction represents a height of the memory device. The blocks could also be arranged in multiple planes.

Figure 4:
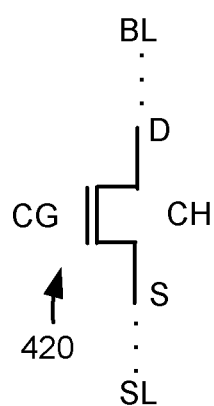
FIG. 4 depicts an example transistor 420.

FIG. 4 depicts an example transistor 420. The transistor comprises a control gate CG, a drain D, a source S and a channel CH and may represent a memory cell or a select gate transistor, for example. The drain end of the transistor is connected to a bit line BL optionally via one or more other transistors in a NAND string, and the source end of the transistor is connected to a source line SL optionally via one or more other transistors in a NAND string, In one approach, the block of memory cells comprises a stack of alternating control gate and dielectric layers, and the memory cells are arranged in vertically extending memory holes in the stack.

A number of layers can be deposited along sidewalls of the memory holes and/or within each word line layer to form memory cells. The layers can include a blocking oxide layer, a charge-trapping layer or film such as silicon nitride (Si3N4) or other nitride, a tunneling layer (e.g., a gate oxide) and a channel (e.g., comprising polysilicon). A dielectric core (e.g., comprising silicon dioxide) may fill a central core of each memory hole.

While the above example is directed to a 3D memory device with vertically extending NAND strings, the techniques provided herein are also applicable to a 2D memory device in which the NAND strings extend horizontally on a substrate.

FIG. 5 depicts an example view of NAND strings in a block BLK0 which is consistent with FIG. 3. The NAND strings are arranged in sub-blocks of the block in a 3D configuration. Each sub-block includes multiple NAND strings, where one example NAND string is depicted. For example, SB0, SB1, SB2 and SB3 comprise example NAND strings 500n, 510n, 520n and 530n, respectively. The NAND strings have data word lines, dummy word lines and select gate lines. Each sub-block comprises a set of NAND strings which extend in the x direction and which have a common SGD line or control gate layer. The NAND strings 500n, 510n, 520n and 530n are in sub-blocks SB0, SB1, SB2 and SB3, respectively. Programming of the block may occur based on a word line programming order. One option is to program the memory cells in different portions of a word line which are in the different sub-blocks, one sub-block at a time, before programming the memory cells of the next word line. For example, this can involve programming WL0 in SB0, SB1, SB2 and then SB2, then programming WL1 in SB0, SB1, SB2 and then SB2, and so forth. The word line programming order may start at WL0, the source-end word line and end at WL95, the drain-end word line, for example.

The NAND strings 500n, 510n, 520n and 530n have channels 500a, 510a, 520a and 530a, respectively. Additionally, NAND string 500n includes SGS transistor 501, dummy memory cell 502, data memory cells 503-514, dummy memory cell 515 and SGD transistor 516. NAND string 510n includes SGS transistor 521, dummy memory cell 522, data memory cells 523-534, dummy memory cell 535 and SGD transistor 536. NAND string 520n includes SGS transistor 541, dummy memory cell 542, data memory cells 543-554, dummy memory cell 555 and SGD transistor 556. NAND string 530n includes SGS transistor 561, dummy memory cell 562, data memory cells 563-574, dummy memory cell 575 and SGD transistor 576.

This example depicts one SGD transistor at the drain-end of each NAND string, and one SGS transistor at the source-end of each NAND string. The SGD transistors in SB0, SB1, SB2 and SB3 may be driven by separate control lines SGD(0), SGD(1), SGD(2) and SGD(3), respectively, in one approach. In another approach, multiple SGD and/or SGS transistors can be provided in a NAND string.

FIG. 6A depicts an example Vth distribution of memory cells, where eight data states are used in an example of MLC programming. In FIGS. 6A and 6B, the vertical axis depicts a number of memory cells on a logarithmic scale, and the horizontal axis depicts a Vth of the memory cells on a linear scale. In one approach, at a start of a program operation, the memory cells are all initially in the erased (Er) state, as represented by the Vth distribution 600. The memory cells assigned to the Er state continue to be represented by the Vth distribution 600 after programming is completed. The memory cells assigned to the A-G states are programmed to the Vth distributions 601-607, respectively, using verify voltages of VvA-VvG, respectively, in program-verify tests. Read voltages VrA-VrG can be used for reading the states of the memory cells in a read operation.

In an erase operation, the data memory cells transition from the Vth distributions of the programmed data states, e.g., states A-G, to the erased state. The erase operation includes an erase phase in which the memory cells are biased for erasing followed by an erase-verify test. The erase-verify test can use an erase-verify voltage, VvEr, which is applied to the word lines.

The Er-G states are examples of assigned data states, and the A-G states are examples of programmed data states, in this eight state example. The number of data states could be higher or low than eight data states.

FIG. 6B depicts an example Vth distribution of memory cells, where two data states are used in SLC programming. An erased state Vth distribution 620 and a programmed state Vth distribution 621 are depicted. The verify voltage is Vv and the read voltage is Vr.

Figures 7A, 7B, 7C, 7D:
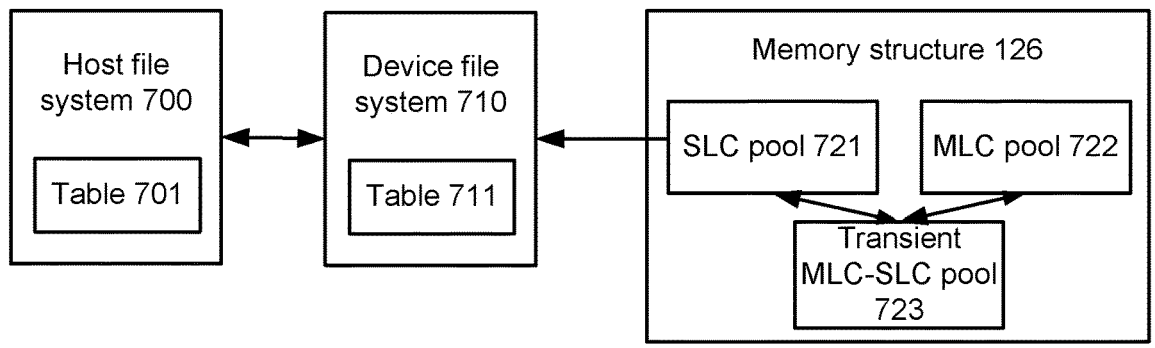
FIG. 7A depicts an example of file system at a host and at a memory device.
FIG. 7B depicts a first example of a block budget consistent with FIG. 7A.
FIG. 7C depicts a second example of a block budget consistent with FIG. 7A.
FIG. 7D depicts an example table of multi-mode block status consistent with FIG. 7C.

FIG. 7A depicts an example of file system at a host and at a memory device. When the host reads data from the memory device, the host does not know where the data is stored in the memory device. Similarly, in a program operation, the host does not know the physical location in the memory device in which data will be written. Instead, the data is identified by the host using one or more logical addresses which are mapped to physical or virtual locations, e.g., block and word lines within the block, by a file system.

A host file system 700 includes one or more tables 701 which cross reference files of data to logical block addresses (LBAs). For example, the file may be divided into sectors. A file can be a video, image, word processing document, application or other data. See, e.g., FIG. 8B.

The memory device file system 710 includes one or more tables 711 which cross reference the LBAs to physical or virtual blocks and pages in the memory structure 126. There can be a direct or indirect mapping from the LBAs to physical addresses. In an example of indirect mapping, the LBA of the host is cross-referenced to a virtual address in the memory device, and the virtual address in the memory device is cross-referenced to a physical address. An address which is mapped to or cross references another address is said to point to the other address.

The memory structure 126 can include an SLC pool 721, an MLC pool 722 and a transient MLC-SLC pool 723. The SLC pool includes dedicated SLC blocks which operate in the SLC mode throughout their lifetime. The lifetime of a block can be measured by the number of program-erase cycles in which it is expected to operate. The MLC pool includes blocks which operate in the MLC mode. The transient MLC-SLC pool includes MLC blocks operating in the SLC mode. As a generalization, the SLC pool can include blocks which are dedicated to operating in an M bit per cell mode, the MLC pool can include blocks which operate in an N bit per cell mode, and the transient MLC-SLC pool can include blocks operating in the M bit per cell mode, where N>M. The pools 721 and 723 therefore comprise blocks operating in the SLC or M bit per cell mode.

In one approach, a fixed number of MLC blocks are allocated to the transient MLC-SLC pool so that a fixed number of blocks are in the SLC or M bit per cell mode throughout the lifetime of the memory device. The MLC blocks can cycle into and out of the transient MLC-SLC pool so that each MLC block is allocated to the MLC-SLC pool for an equal number (e.g., equal, or within a specified plus/minus tolerance) of P-E cycles in the SLC or M bit per cell mode. The MLC blocks can be operated so that the number of SLC or M bit per cell P-E cycles is equal (e.g., equal, or within a specified plus/minus tolerance) among the MLC blocks over the lifetime of the memory device. The MLC blocks can also be operated so that the number of MLC or N bit per cell P-E cycles is equal (e.g., equal, or within a specified plus/minus tolerance) among the MLC blocks over the lifetime of the memory device. The transient MLC-SLC pool can be relatively small in size, compared to the MLC pool and the SLC pool. These and other implementation details are discussed further below.

FIG. 7B depicts a first example of a block budget consistent with FIG. 7A. In this example, the memory structure has a total of 1,478 blocks. There are 115 dedicated SLC blocks, and a specified memory endurance of 100 k or 100,000 P-E cycles. The memory endurance refers to the maximum number of P-E cycles in which the block is expected to operate reliably, e.g., without uncorrectable read errors. The product endurance refers to the maximum number of P-E cycles in which the block is required to operate in a particular product, and this can be less than the memory endurance. The endurance of a memory cell is limited because the blocking oxide is degraded from the stress of the P-E cycles. This leads to an increase in a leakage current and a reduction in data retention.

There are 1,283 MLC capacity blocks which have a memory endurance of 5 k cycles and a product endurance of 3 k cycles. The endurance of MLC blocks is typically much lower than that of SLC blocks due to factors such as the use of higher program voltages and a longer programming time. There are 41 other blocks, such as spare blocks and control blocks, and the bad block limit is 39 blocks.

FIG. 7C depicts a second example of a block budget consistent with FIG. 7A. This example adds a category for the transient MLC-SLC pool 723 with two blocks. Advantageously, the number of dedicated SLC blocks can be decreased by 48 blocks to 67 blocks, and the bad block limit is increased by 46 blocks to 85 blocks. There are 41 other blocks as in FIG. 7B.

Essentially, the P-E cycles which the MLC blocks would have performed in the MLC or N bits per cell mode are re-allocated as P-E cycles in the SLC or M bit per cell mode, so that the number of dedicated SLC blocks can be reduced. Moreover, this re-allocation can come from the extra P-E cycles which are based on the difference between the memory endurance and the product endurance. The difference is 5 k–3 k=2 k P-E cycles per block in this example. Moreover, a P-E cycle in MLC mode correlates with more than one P-E cycle in SLC mode since the amount of deterioration of the memory cells due to a P-E cycle in the SLC mode is less than the amount due to a P-E cycle in the MLC mode. As a result, the 2 k P-E cycles which are re-allocated from the MLC mode to the SLC mode can translate to perhaps 4 k SLC cycles. See, e.g., FIG. 10A-10C. By increasing the bad block limit, the yield of the memory device manufacturing process can be improved.

FIG. 7D depicts an example table of multi-mode block status consistent with FIG. 7C. A bit or other flag can be maintained in a table such as an inverted global address table (IGAT) by the controller or circuitry 110, to identify whether an MLC block is in the SLC or MLC mode. In this example, the MLC blocks are numbered from 0 to 1283, one bit indicates whether the block is in the SLC or MLC mode (with a bit value of 0 or 1, respectively) and another bit indicates whether the block is retired (where a bit value of 0 or 1 corresponds to no or yes, respectively). A block is retired when it is at the end of its lifetime and is no longer used. A block may be retired when it reaches a threshold number of P-E cycles, for instance. In one approach, the retiring involves moving an identifier of the block from a list of active blocks to a list of retired blocks, which are not available for storing data. A pointer to the block can also be removed from the memory device file system table 711.

FIG. 8A depicts an example process for programming data to SLC blocks in the pool 721 or 723 of FIG. 7A, then copying the data to MLC blocks in the pool 722. As mentioned, one approach to using the SLC and MLC blocks is for data from the host to be written to the SLC blocks initially and then copied to the MLC blocks for long term storage, in a folding operation. It is desirable to store data which is received from a host in SLC blocks because the data can be written more quickly to these blocks. This allows for a high speed data transfer from the host such as in a burst mode. After the data is stored in one or more SLC blocks, it can be transferred to one or more MLC blocks. Typically, the data of multiple SLC blocks is transferred to one MLC block, such as depicted in FIG. 8E.

Step 800 includes updating a host file system table to identify data to be written to a memory device. See FIG. 8B. Step 801 includes transferring data from the host device to the memory device for writing in the SLC blocks of the memory device. This involves programming memory cells of one or more word lines of the SLC blocks. In one approach, the data is stored in one SLC block until it become full and then in a next SLC block, and so forth. Step 802 includes updating the memory device file system table, e.g., to cause the logical block addresses of the host to point to physical addresses of the SLC blocks. See FIG. 8C.

A decision step 803 determines if the SLC blocks are full. This may involve determining if a set of SLC blocks is full, where this set contains data which can be copied to one MLC block. For example, this determination can be made by the controller 122 or circuitry 110 within the memory device (FIG. 1). If decision step 803 is false, the process returns to step 801 to wait to receive additional data from the host to store in the SLC blocks. If decision step 803 is true, step 804 includes copying data from the SLC blocks to an MLC block. This involves reading memory cells of the SLC blocks and programming the read data into memory cells of the MLC block. Moreover, a page which is read from an SLC block can be stored as a lower, middle or upper page in the MLC block, assuming three bit cells are used in the MLC block. In one approach, data from three word lines of an SLC block is stored in one word line of an MLC block. This can be one physical word line or one virtual word line which comprises multiple physical word lines. Step 805 includes updating the memory device file system table to cause the logical block addresses of the host to point to physical addresses in the MLC blocks. See FIG. 8D.

FIG. 8B depicts the example host file system table 701 of FIG. 7A which is updated consistent with step 800 of FIG. 8A. The table includes a column for a file name and a column for a logical address. The file names identifies different files and their sectors. Each sector points to a corresponding logical address. In this simplified example, the logical addresses are consecutive numbers, 0-8. Also, each file has the same number of sectors. In other cases, the logical addresses are non-consecutive and different files can have different numbers of sectors. File 1, sectors 0-2 are associated with logical addresses 0-2, respectively. File 2, sectors 0-2 are associated with logical addresses 3-5, respectively. File 3, sectors 0-2 are associated with logical addresses 6-8, respectively.

FIG. 8C depicts the example memory device file system table 711 of FIG. 7A which is updated consistent with step 802 of FIG. 8A. The table includes columns for the logical address of the host, and at the memory device, an SLC physical address and an MLC physical address. The data associated with logical addresses 0-2 at the host are stored at SLC block 0, pages 0-2, respectively. The data associated with logical addresses 3-5 at the host are stored at SLC block 1, pages 0-2, respectively. The data associated with logical addresses 6-8 at the host are stored at SLC block 2, pages 0-2, respectively. The data is not yet associated with an MLC block, as represented by the notation "n/a" (not applicable).

FIG. 8D depicts the example memory device file system table 711 of FIG. 7A which is updated consistent with step 805 of FIG. 8A. In this case, the data is no longer associated with an SLC block, as represented by the notation "n/a" (not applicable). The data associated with logical addresses 0-8 at the host are stored at MLC block 3, pages 0-8, respectively, in this example.

FIG. 8E depicts an example of copying data from SLC blocks to an MLC block, consistent with FIG. 8A. Each SLC block includes data on three word lines, as a simplified example, where one page of data is stored in each word line, in this example. The MLC block, block 3, also includes data on three word lines, where three pages of data are stored in each word line. In the SLC block 0, pages 0, 1 and 2 are stored in word lines 851, 852 and 853, respectively. In the SLC block 1, pages 0, 1 and 2 are stored in word lines 854, 855 and 856, respectively. In the SLC block 2, pages 0, 1 and 2 are stored in word lines 857, 858 and 859, respectively.

When the SLC data is copied to the MLC block, pages 0, 1 and 2 of SLC block 0 are stored in a first word line 861 of MLC block 3 as pages 0, 1 and 2, respectively. Pages 0, 1 and 2 of SLC block 1 are stored in a second word line 862 of MLC block 3 as pages 3, 4, and 5, respectively. Pages 0, 1 and 2 of SLC block 2 are stored in a third word line 863 of MLC block 3 as pages 6, 7 and 8, respectively. The three pages of an SLC block may be stored as lower, middle and upper pages, respectively of a word line in the MLC block.

Figure 9A:
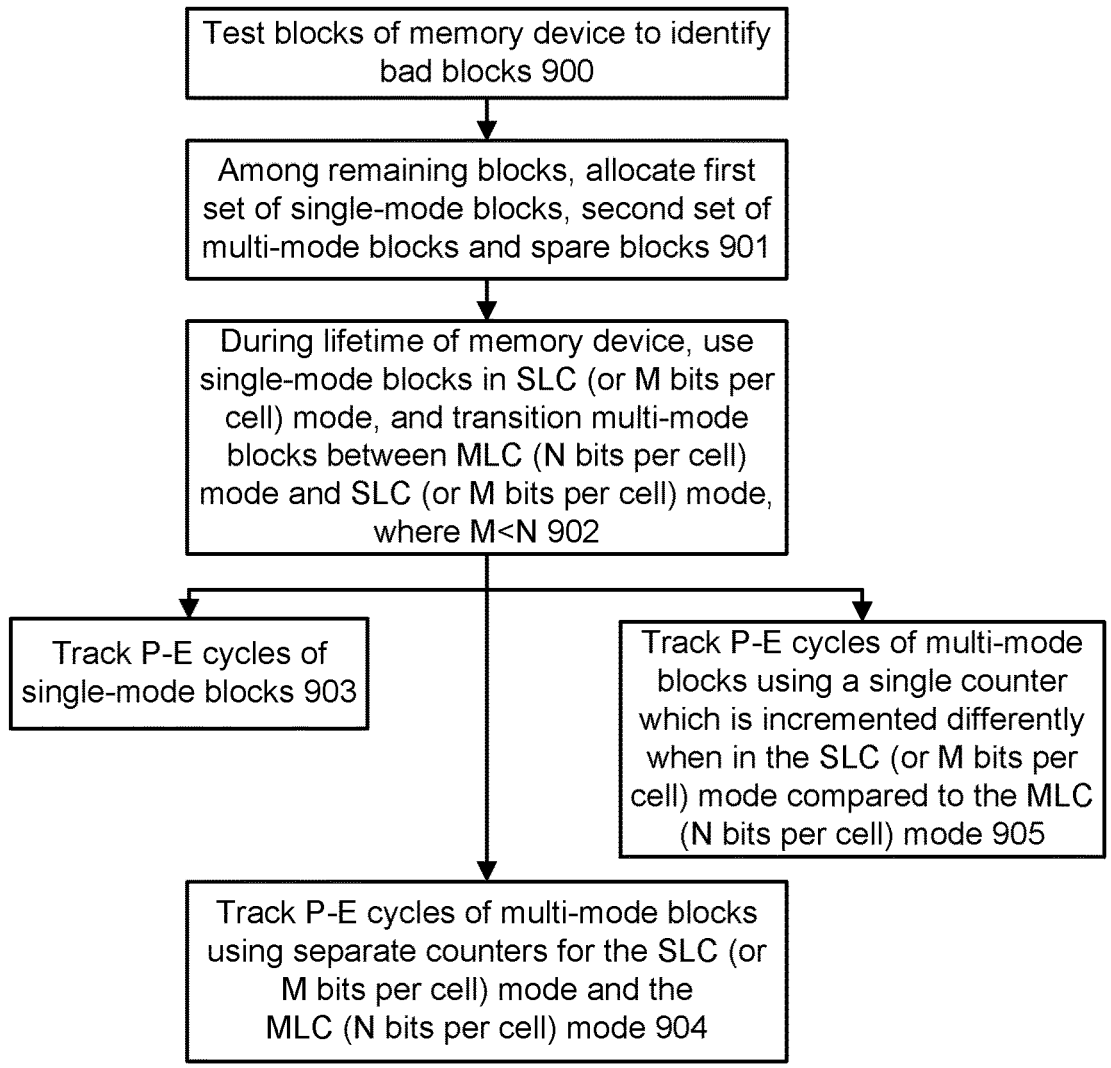
FIG. 9A depicts an example process for allocating blocks in a memory device.

FIG. 9A depicts an example process for allocating blocks in a memory device. Step 900 includes testing blocks of a memory device to identify bad blocks. For example, this can include writing data to a block and reading the data back. If there are uncorrectable errors, the block is declared a bad block. Step 901 includes, among the remaining blocks, allocating a first set of single-mode blocks, a second set of multi-mode blocks and spare blocks. See FIG. 9B. For example, the single-mode blocks can be SLC blocks or M bit per cell blocks, where M>=1 bit per cell, and the multi-mode blocks can be MLC blocks with N bits per cell, where N>1 and N>M. Step 902 includes, during the lifetime of the memory device, using the single-mode blocks in SLC (or M bits per cell) mode, and transitioning multi-mode blocks between MLC (N bits per cell) mode and SLC (or M bits per cell) mode, where M<N. Various options are possible, as discussed further below.

Step 903 includes tracking the P-E cycles of the single-mode blocks. Step 904 or 905 may be used for the multi-mode blocks. Step 904 includes tracking the P-E cycles of the multi-mode blocks using separate counters (e.g., first and second counters, respectively) for the SLC (or M bits per cell) mode and the MLC (N bits per cell) mode. Step 905 includes tracking P-E cycles of the multi-mode blocks using a single counter which is incremented differently when in the SLC (or M bits per cell) mode compared to the MLC (N bits per cell) mode. The counter may be incremented by a smaller amount for a P-E cycle in the SLC mode compared to a P-E cycle in the MLC mode. See FIG. 10C.

Tracking a multi-mode block with separate counters provides greater control of the use of the blocks since the separate counters maintain the exact number of P-E cycles for each mode and can be used to maintain the number of SLC and MLC P-E cycles within respective ranges. Tracking a multi-mode block with a single counter requires less overhead data to maintain the count. In either approach, the increased wear of a block which occurs with an MLC P-E cycle compared to an SLC P-E cycle can be accounted for. Additionally, the single or separate counts can be used to make decisions such as selecting an MLC block to transition from the MLC mode to the SLC mode, program in the SLC mode, program in the MLC mode, or retire.

Figure 9B:
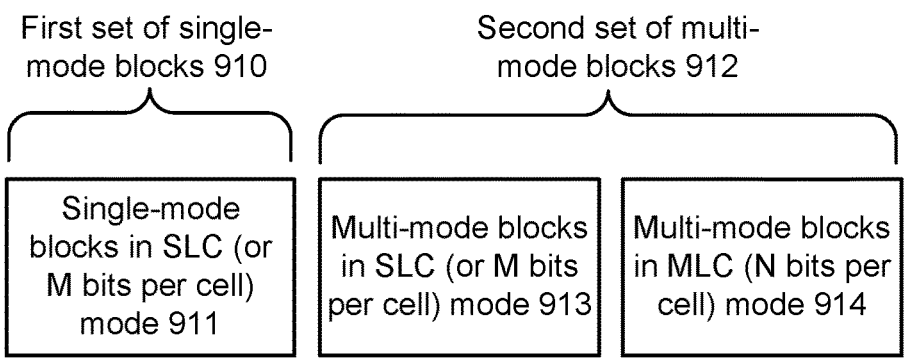
FIG. 9B depicts an example of a first set of single-mode blocks 910 and a second set of multi-mode blocks 912, consistent with FIG. 9A.

FIG. 9B depicts an example of a first set of single-mode blocks 910 and a second set of multi-mode blocks 912, consistent with FIG. 9A. The first set of single-mode blocks 910 includes single-mode blocks in the SLC (or M bits per cell) mode 911. This could be the 67 SLC blocks in FIG. 7C. The second set of blocks includes multi-mode blocks in the SLC (or M bits per cell) mode 913 (this could be the 2 transient MLS-SLC blocks in FIG. 7C) and multi-mode blocks in the MLC (N bits per cell) mode (this could be the 1,283 MLC capacity blocks in FIG. 7C). In one approach, the sizes of the first and second sets are fixed, and the number of blocks 913 and 914 are also fixed throughout the lifetime of the memory device, to provide a predictable number of P-E cycles in the SLC and MLC modes. Optionally, fewer or more multi-mode blocks in the SLC (or M bits per cell) mode can be used if appropriate throughout the lifetime of the memory device.

Figure 9C:
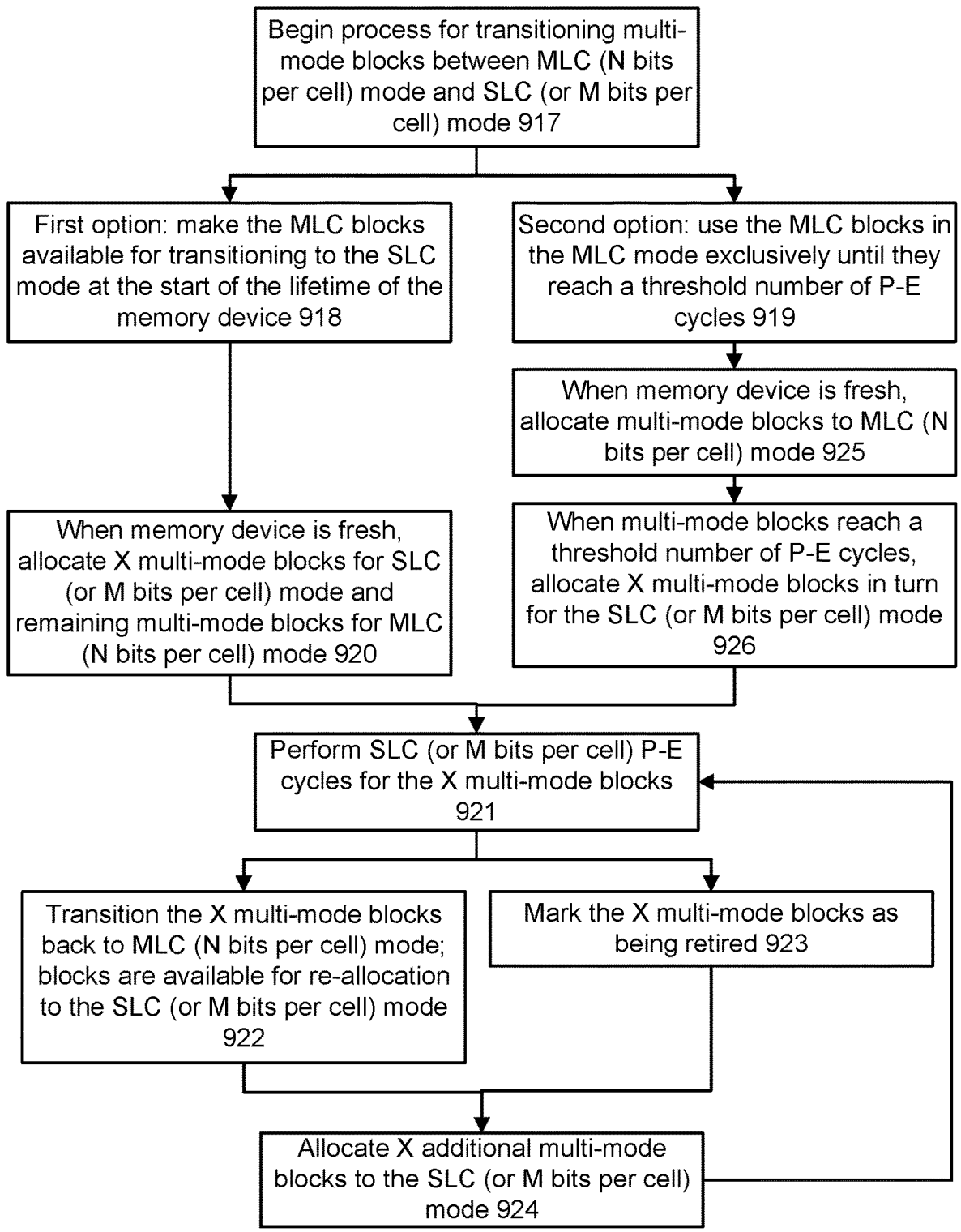
FIG. 9C depicts an example process for transitioning multi-mode blocks between MLC (N bits per cell) mode and SLC (or M bits per cell) mode, consistent with FIG. 9A.

FIG. 9C depicts an example process for transitioning multi-mode blocks between MLC (N bits per cell) mode and SLC (or M bits per cell) mode, consistent with FIG. 9A. Step 917 begins the process for transitioning multi-mode blocks between MLC (or N bits per cell) mode and SLC (or M bits per cell) mode. At step 918, a first option involves making the MLC blocks available for transitioning to the SLC mode at the start of the lifetime of the memory device, when the memory device is fresh and has no P-E cycles. With this option, the MLC blocks are repeatedly transitioned between the MLC and SLC modes. The MLC blocks are subject to wear in MLC and SLC modes at different times. The first option involves step 920. Step 920 includes, when the memory device is fresh, allocating a number X multi-mode blocks for SLC (or M bits per cell) mode and the remaining multi-mode blocks for MLC (N bits per cell) mode. For example X=2 blocks in FIG. 7C.

At step 919, a second option involves using the MLC blocks in the MLC mode exclusively until they reach a threshold number of P-E cycles, such as 3 k P-E cycles. Subsequently, the MLC blocks can be used exclusively in the SLC mode until an end of their lifetime. Or they can be repeatedly transitioned between the MLC and SLC modes. This approach allows the MLC blocks to be used in the MLC mode when they are at an earlier part of their lifetime, and less degraded, and in an SLC mode at a later part of their lifetime. The second option involves steps 925 and 926. Step 925 includes, when the memory device is fresh, allocating multi-mode blocks to MLC (N bits per cell) mode. Step 926 includes, when the multi-mode blocks reach a threshold number of P-E cycles, allocating X multi-mode blocks in turn for the SLC (or M bits per cell) mode.

In one approach, a selected block of the second set of blocks transitions from the N bit per cell mode to the M bit per cell mode a single time in a lifetime of the selected block and remains in the M bit per cell mode in a remainder of its lifetime.

Step 921 includes performing SLC (or M bits per cell) P-E cycles for the X multi-mode blocks. This can be done for a specified number of one or more P-E cycles or until a lifetime limit on P-E cycles is reached. Subsequently, in one option, step 922 includes transitioning the X multi-mode blocks back to MLC (N bits per cell) mode, where the blocks are available for re-allocation to the SLC (or M bits per cell) mode. In another option, step 923 includes marking the X multi-mode blocks are being retired. The X multi-mode blocks can be transitioned into the SLC mode and back to the MLC mode individually, at different times, or concurrently, as a group. Step 924 includes allocating X additional multi-mode blocks to the SLC (or M bits per cell) mode.

In this process, a selected block of the second set of blocks may remain in the M bit per cell mode for a predetermined number of multiple M bit per cell program-erase cycles. Also, a predetermined number (e.g., X) of blocks of the second set of blocks may be in the M bit per cell mode throughout a lifetime of the plurality of blocks as different blocks of the second set of blocks transition between the M bit per cell mode and the N bit per cell mode.

In one approach, each MLC block is used in the SLC or M bit per cell mode for 4 k consecutive cycles and then either returned to the MLC pool 722 or retired. The block exchange between the MLC pool 722 and the transient MLC-SLC pool occurs about 640 times in this example, with a transient MLC-SLC pool size of two blocks, before all of about 1,280 MLC blocks are equally used. During every block exchange, when these two blocks are exercised for 4 k cycles, the other blocks in the SLC pool will be cycled only about 100 k/640 times. This ratio of wear leveling across the SLC and the transient pool can be maintained to ensure that the dedicated SLC blocks are used for 100 k cycles and the transient blocks are used in the SLC or M bit per cell mode for 4 k cycles.

Figure 9D:
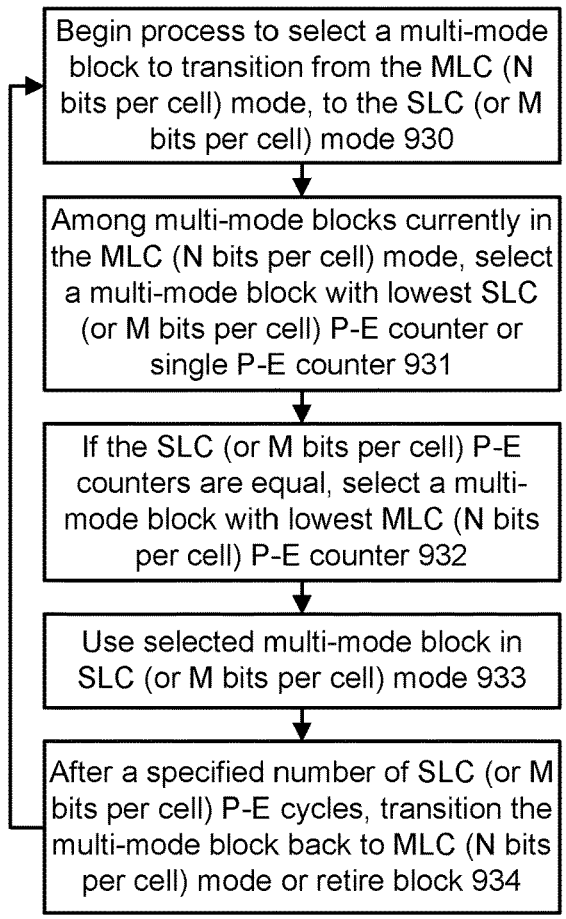
FIG. 9D depicts an example process for selecting a multi-mode block to transition from the MLC (N bits per cell) mode to the SLC (or M bits per cell) mode, consistent with FIG. 9A.

FIG. 9D depicts an example process for selecting a multi-mode block to transition from the MLC (N bits per cell) mode to the SLC (or M bits per cell) mode, consistent with FIG. 9A. From time to time, new MLC blocks can be selected to transition from the MLC mode to the SLC mode. Step 930 begins the process to select a multi-mode block to transition from the MLC (N bits per cell) mode, to the SLC (or M bits per cell) mode. Step 931 includes, among the multi-mode blocks currently in the MLC (N bits per cell) mode, select a multi-mode block with the lowest SLC (or M bits per cell) P-E counter or single P-E counter. Step 932 represents a tie-breaking process if there is a tie among the counts of different MLC blocks in step 931. Step 932 includes, if the SLC (or M bits per cell) P-E counters are equal, select a multi-mode block with lowest MLC (N bits per cell) P-E counter. In this way, an MLC block with a least amount of degradation is selected. Step 933 includes using the selected multi-mode block in the SLC (or M bits per cell) mode. Step 934 includes, after a specified number of SLC (or M bits per cell) P-E cycles, transitioning the multi-mode block back to MLC (N bits per cell) mode or retiring the block.

In this process, a selected block is selected among the second set of blocks to transition from the N bit per cell mode to the M bit per cell mode based on its respective count of M bit per cell program-erase cycles being lower than respective counts of M bit per cell program-erase cycles of other blocks in the second set of blocks.

In step 932, the selected block is selected among the second set of blocks to transition from the N bit per cell mode to the M bit per cell mode based on its respective count of M bit per cell program-erase cycles being equal to respective counts of M bit per cell program-erase cycles of other blocks in the second set of blocks and its respective count of N bit per cell program-erase cycles being lower than respective counts of N bit per cell program-erase cycles of other blocks in the second set of blocks.

Figure 9E:
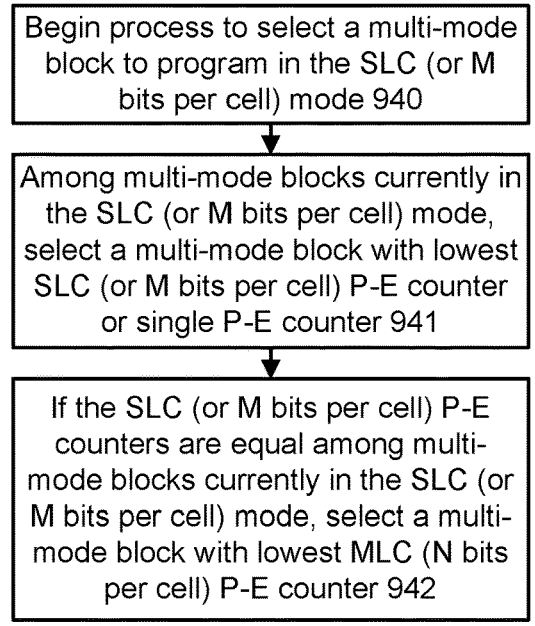
FIG. 9E depicts an example process for selecting a multi-mode block to program in the SLC (or M bits per cell) mode, consistent with FIG. 9A.

FIG. 9E depicts an example process for selecting a multi-mode block to program in the SLC (or M bits per cell) mode, consistent with FIG. 9A. Once one or more MLC blocks are in the SLC (or M bits per cell) mode, step 940 begins a process to select a multi-mode block to program in the SLC (or M bits per cell) mode. The selection can be among the blocks 913 in FIG. 9B. Step 941 includes, among the multi-mode blocks currently in the SLC (or M bits per cell) mode, selecting a multi-mode block with the lowest SLC (or M bits per cell) P-E counter or single P-E counter. Step 942 represents a tie-breaking process if there is a tie among the counts of different MLC blocks in step 941. Step 942 includes, if the SLC (or M bits per cell) P-E counters are equal among the multi-mode blocks currently in the SLC (or M bits per cell) mode, selecting a multi-mode block with lowest MLC (N bits per cell) P-E counter. In this way, an MLC block with a least amount of degradation is selected.

In this process, a control circuit is configured to maintain a respective count of M bit per cell program-erase cycles of each block of the second set of blocks, and maintain a respective count of N bit per cell program-erase cycles of each block of the second set of blocks. The control circuit is also configured to keep the respective counts of M bit per cell program-erase cycles of the second set of blocks uniform within a first tolerance, and keep the respective counts of N bit per cell program-erase cycles of the second set of blocks uniform within a second tolerance, as blocks in the second set of blocks repeatedly transition between the N bit per cell mode and the M bit per cell mode.

At step 942, the selected block is selected among the second set of blocks to transition from the N bit per cell mode to the M bit per cell mode based on its respective count of N bit per cell program-erase cycles being lower than respective counts of N bit per cell program-erase cycles of other blocks in the second set of blocks.

FIG. 9E is also an example of selecting a block to program among the second set of blocks based on its respective count of N bit per cell program-erase cycles being equal to respective counts of N bit per cell program-erase cycles of other blocks in the second set of blocks and its respective count of M bit per cell program-erase cycles being lower than respective counts of M bit per cell program-erase cycles of other blocks in the second set of blocks.

Figure 9F:
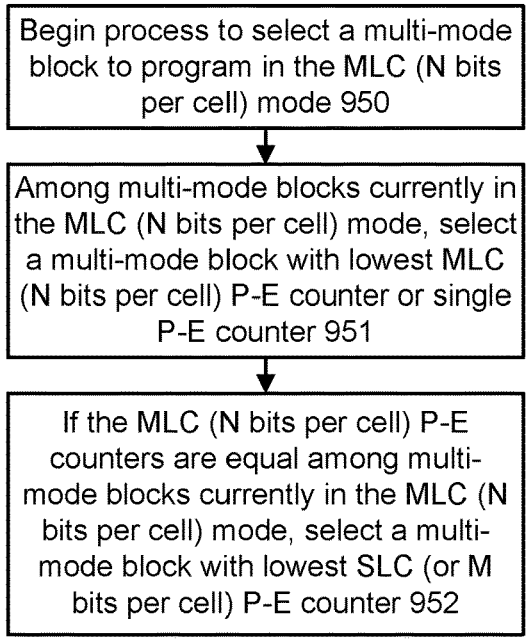
FIG. 9F depicts an example process for selecting a multi-mode block to program in the MLC (or N bits per cell) mode, consistent with FIG. 9A.

FIG. 9F depicts an example process for selecting a multi-mode block to program in the MLC (or N bits per cell) mode, consistent with FIG. 9A. Step 950 includes beginning a process to select a multi-mode block to program in the MLC (N bits per cell) mode. The selection can be among the blocks 914 in FIG. 9B. Step 951 includes, among multi-mode blocks currently in the MLC (N bits per cell) mode, selecting a multi-mode block with the lowest MLC (N bits per cell) P-E counter or single P-E counter. Step 952 includes, if the MLC (N bits per cell) P-E counters are equal among the multi-mode blocks currently in the MLC (N bits per cell) mode, selecting a multi-mode block with lowest SLC (or M bits per cell) P-E counter.

Figure 9G:
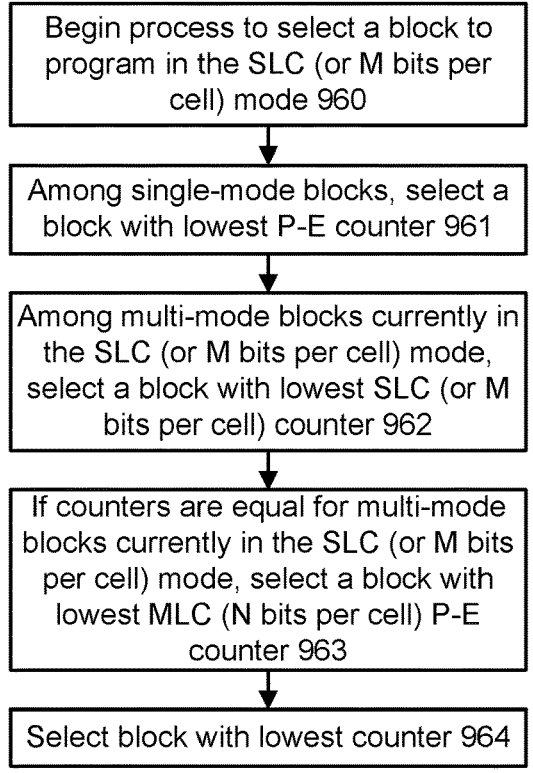
FIG. 9G depicts an example process for selecting a single-mode block or a multi-mode block to program in the SLC (or M bits per cell) mode, consistent with FIG. 9A.

FIG. 9G depicts an example process for selecting a single-mode block or a multi-mode block to program in the SLC (or M bits per cell) mode, consistent with FIG. 9A. Step 960 begins a process to select a block to program in the SLC (or M bits per cell) mode. A difference from FIG. 9E is that FIG. 9G includes the dedicated SLC blocks in the decision process so that the selection is among the blocks 910 and 913 in FIG. 9B. Step 961 includes, among the single-mode blocks, selecting a block with the lowest P-E counter. Step 962 includes, among the multi-mode blocks currently in the SLC (or M bits per cell) mode, selecting a block with lowest SLC (or M bits per cell) counter. Step 963 includes, if the counters are equal for the multi-mode blocks currently in the SLC (or M bits per cell) mode at step 962, selecting a block with the lowest MLC (N bits per cell) P-E counter. This is a tie-breaking process. Step 964 includes selecting a block with the lowest counter, among the previously-selected blocks in steps 961-963.

This process is an example of selecting a transitioned block in the second set of blocks to program in the M bit per cell mode instead of a block in the first set of blocks based on the respective count of M bit per cell program-erase cycles of the transitioned block in the second set of blocks being lower than the respective count of program-erase cycles of the block of the first set of blocks.

Figure 9H:
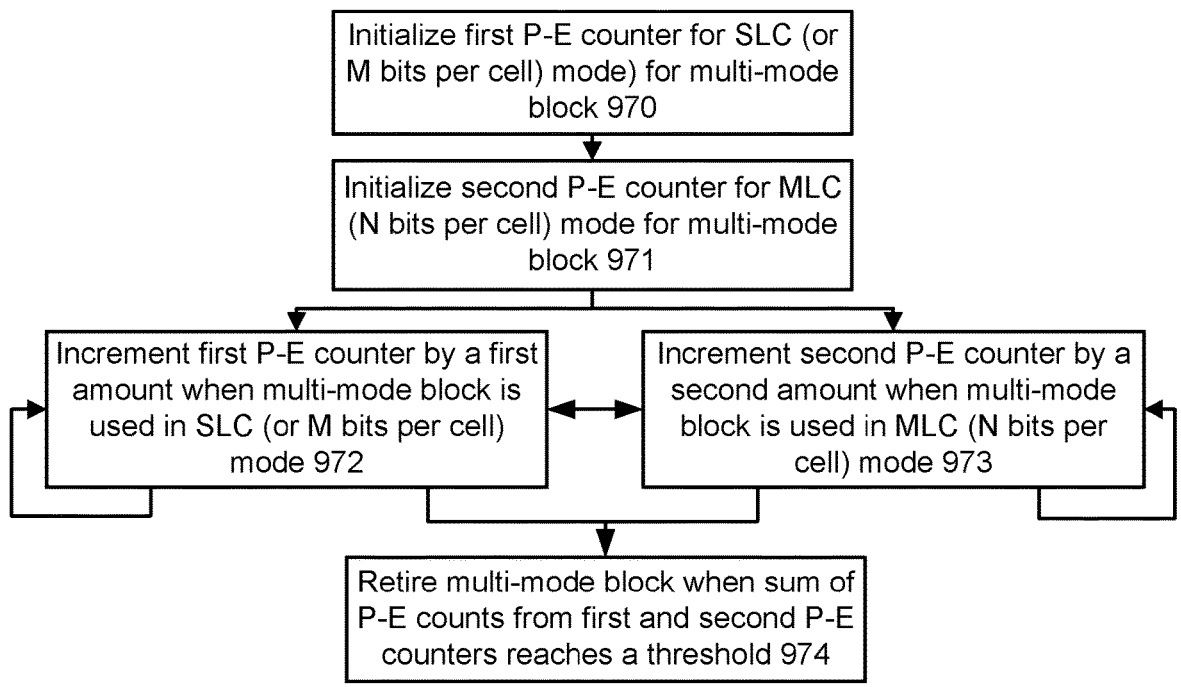
FIG. 9H depicts an example process for maintaining first and second P-E cycle counters, consistent with step 904 of FIG. 9A.

FIG. 9H depicts an example process for maintaining first and second P-E cycle counters, consistent with step 904 of FIG. 9A. Step 970 includes initializing (e.g., setting to zero) a first P-E counter for SLC (or M bits per cell) mode for a multi-mode block. The first P-E counter, such as the MLC P-E cycle tracking circuit (for SLC mode) 119 in FIG. 1, keeps track of M bit per cell program-erase cycles. Step 971 includes initializing a second P-E counter for MLC (N bits per cell) mode for a multi-mode block. The second P-E counter, such as the MLC P-E cycle tracking circuit (for MLC mode) 117 in FIG. 1, keeps track of N bit per cell program-erase cycles. Step 972 includes incrementing the first P-E counter by a first amount when the multi-mode block is used in the SLC (or M bits per cell) mode. Step 973 includes incrementing a second P-E counter by a second amount when the multi-mode block is used in the MLC (N bits per cell) mode. The amount of the increment can correspond to the amount of degradation of the memory cells. The first amount can be less than the second amount since a P-E cycle in the SLC (or M bits per cell) mode causes less degradation than a P-E cycle in the MLC (or N bits per cell) mode. See also FIG. 10C.

In one option, the amount of the increments in steps 972 and 973 changes over the lifetime of the memory device. For example, the increment in step 972 can increase progressively when the multi-mode block is used in the SLC (or M bits per cell) mode, and the increment in step 973 can increase progressively when the multi-mode block is used in the MLC (N bits per cell) mode. See also FIG. 10C. A rate of increase of the second increment over the P-E cycles can be lower than a rate of increase of the first increment over the P-E cycles, since the memory cells tend to degrade faster when in the MLC (N bits per cell) mode compared to the SLC (or M bits per cell) mode. In this approach, the count accurately represents the amount of degradation of the memory cells. In contrast, if the count was incremented by a fixed amount for each P-E cycle throughout the lifetime of the memory device, it would tend to over-estimate the degradation when the count was lower and under-estimate the degradation when the count was higher.

Step 972 can be repeated or transition to step 973, and step 973 can be repeated or transition to step 972. Step 974 includes retiring the multi-mode block when the sum of P-E counts from the first and second P-E counters reaches a threshold.

Figure 9I:
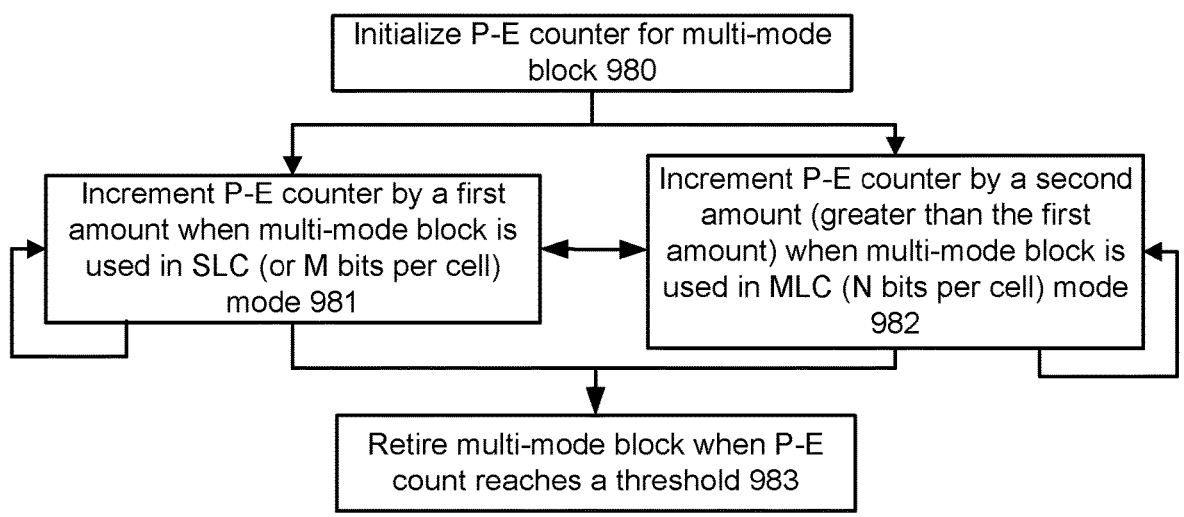
FIG. 9I depicts an example process for a single P-E cycle counter, consistent with step 905 of FIG. 9A.

FIG. 9I depicts an example process for a single P-E cycle counter, consistent with step 905 of FIG. 9A. Step 980 includes initializing the single P-E counter, such as the MLC P-E cycle tracking circuit (for SLC and MLC modes) 121 in FIG. 1, for a multi-mode block. Step 981 includes incrementing the P-E counter by a first amount when the multi-mode block is used in the SLC (or M bits per cell) mode. Step 982 includes incrementing the P-E counter by a second amount when the multi-mode block is used in the MLC (N bits per cell) mode. The first amount can be less than the second amount, and the amount of the increment can change over the lifetime of the memory device, as discussed in connection with FIG. 9H.

Step 981 can be repeated or transition to step 982, and step 982 can be repeated or transition to step 981. Step 983 includes retiring the multi-mode block when the P-E count reaches a threshold.

A related process can include programming and erasing data in a first set of blocks in an M bit per cell mode, programming and erasing data in a second set of blocks in an N bit per cell mode, transitioning blocks in the second set of blocks to the M bit per cell mode from the N bit per cell mode, where M<N, and maintaining a respective count of program-erase cycles for each block of the second set of blocks, where the respective count of program-erase cycles is incremented by a first amount when data is programmed and erased in the block in the M bit per cell mode and by a second amount, which is greater than the first amount, when data is programmed and erased in the block in the N bit per cell mode.

The process can further include increasing the first amount by progressively larger increments as data is repeatedly programmed and erased in the block in the M bit per cell mode over time; increasing the second amount in progressively larger increments which are larger than the progressively larger increments of the first amount as data is repeatedly programmed and erased in the block in the N bit per cell mode over time, and retiring each block in the second set of blocks when the respective count of program-erase cycles reaches a threshold.

In a further aspect, each block of the second set of blocks operates in the N bit per cell mode until its respective count of program-erase cycles reaches a threshold, after which each block of the second set of blocks transitions to the M bit per cell mode.

In a further aspect, after transitioning to the M bit per cell mode from the N bit per cell mode, each block of the second set of blocks remains in the M bit per cell mode in a remainder of its lifetime.

In a further aspect, each block of the second set of blocks transitions repeatedly between the N bit per cell mode and the M bit per cell mode based on its respective count of program-erase cycles.

Figure 10A:
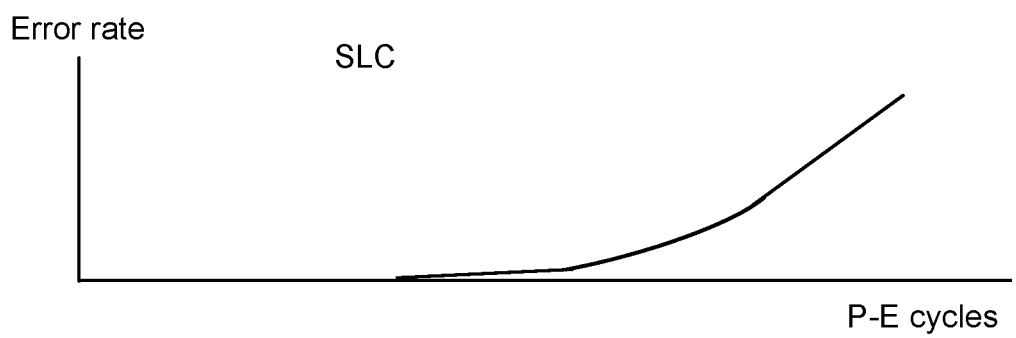
FIG. 10A depicts a plot of an error rate versus a number of P-E cycles for blocks in an SLC mode.

FIG. 10A depicts a plot of an error rate versus a number of P-E cycles for blocks in an SLC mode. The horizontal axis may represent 100 k P-E cycles, for example. As mentioned, the blocking oxide layer of a memory cell is degraded from the stress of the P-E cycles. The degradation is a function of the amount of charge stored in the memory cells. The average charge stored in a memory cell is about twice as much in MLC mode compared to SLC mode. Moreover, this damage becomes progressively larger over the lifetime of the memory cell, as the number of P-E cycles increases. The plot indicates that the error rate is close to zero for about the first half of the lifetime of the memory cell, then increases at a relatively low rate and then at a relatively high rate. The error rate is a measurement of the degradation.

Figure 10B:
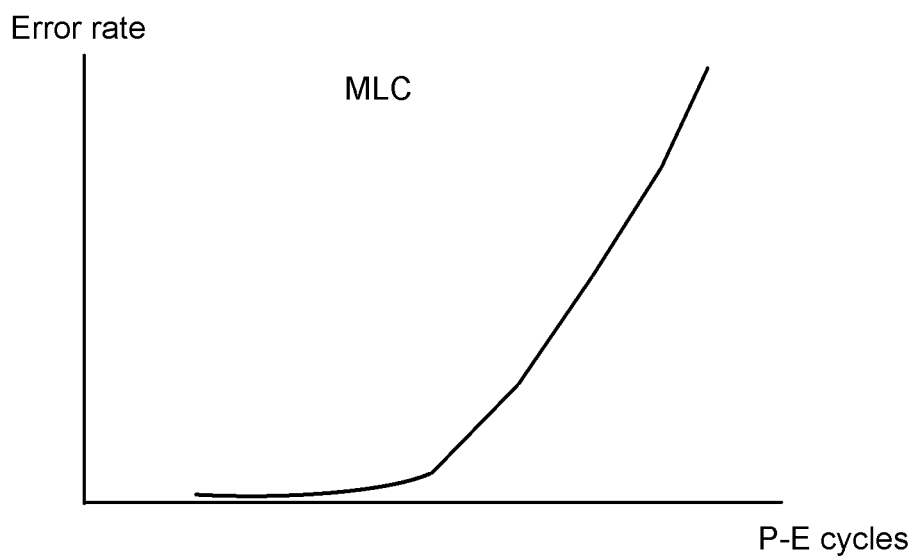
FIG. 10B depicts a plot of an error rate versus a number of P-E cycles for blocks in an MLC mode.

FIG. 10B depicts a plot of an error rate versus a number of P-E cycles for blocks in an MLC mode. The horizontal axis may represent 5 k P-E cycles, for example. As in FIG. 10B, the damage becomes progressively larger over the lifetime of the memory cell, as the number of P-E cycles increases. The plot indicates that the error rate is close to zero for about the first half of the lifetime of the memory cell, then increases at a relatively high rate. The vertical axis in FIG. 10B is about ten times greater than in FIG. 10A.

Figure 10C:
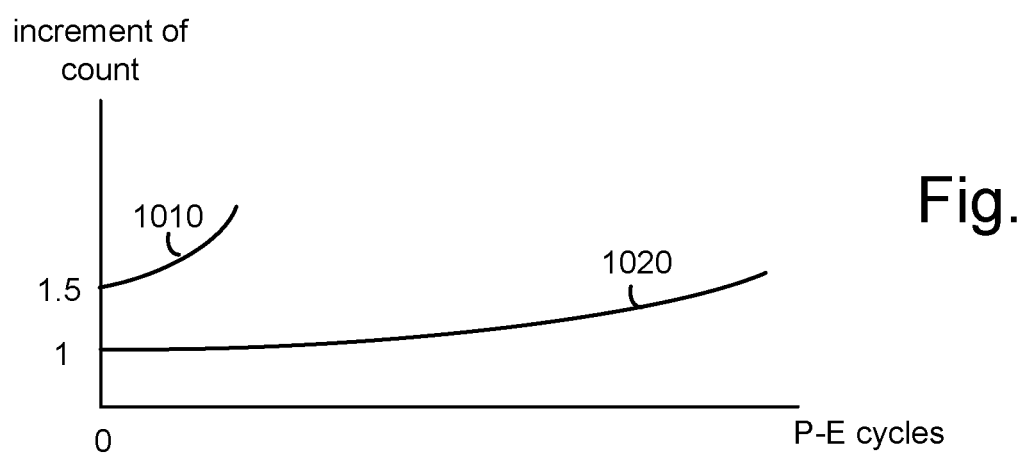
FIG. 10C depicts a plot of an increment of a P-E cycle counter versus a number of P-E cycles for blocks in an SLC or MLC mode.

FIG. 10C depicts a plot of an increment of a P-E cycle counter versus a number of P-E cycles for blocks in an SLC or MLC mode. A plot 1010 is for the MLC (N bits per cell) mode and a plot 1020 is for the SLC (or M bits per cell) mode. An increment of 1 can be used initially starting at a P-E cycle count of 0 cycles for the SLC (or M bits per cell) mode. A larger increment of 1.5, for instance, can be used initially for the MLC (or N bits per cell) mode. The increment of plot 1010 increases relatively quickly as the P-E cycles increase while the increment of plot 1020 increases relatively slowly as the P-E cycles increase. The plot 1010 may increase to 2.5, for example, while the plot 1020 increases to 1.5. Another option is for plot 1010 to begin at 1 and for plot 1020 to begin at a value between 0 and 1.

This is an example of the SLC cycles being weighted less heavily than the MLC cycles.

As mentioned, the increment or amount by which the P-E cycle count increases can increase progressively as the number of P-E cycles increases. As a result, the current count accurately represents the amount of degradation of a block. The use of the count in decisions such as selecting a multi-mode block to transition to/from the SLC mode, or selecting a block to program, can therefore be made based on an accurate assessment of the amount of degradation of the block. Moreover, the amount of degradation can be kept relatively constant among the blocks in a wear leveling process.

In one approach, a control circuit is configured to maintain a respective count of M bit per cell program-erase cycles of each block of the second set of blocks, and maintain a respective count of N bit per cell program-erase cycles of each block of the second set of blocks. The control circuit is also configured to increment the count of N bit per cell program-erase cycles of each block of the second set of blocks in progressively larger increments over time, and increment the count of M bit per cell program-erase cycles of each block of the second set of blocks in progressively larger increments over time at a lower rate than the increase of the increments for the count of N bit per cell program-erase cycles. Further, a selected block is selected among the second set of blocks to transition from the N bit per cell mode to the M bit per cell mode based on its respective count of N bit per cell program-erase cycles and its respective count of M bit per cell program-erase cycles.

In another approach, the control circuit is configured to increment the count of M bit per cell program-erase cycles of each block of the second set of blocks in progressively larger increments over time at a lower rate that the increase of the increments for the count of N bit per cell program-erase cycles, and retire each block in the second set of blocks based on a sum of its respective count of M bit per cell program-erase cycles and its respective count of N bit per cell program-erase cycles.

Accordingly, it can be seen that, in one implementation, an apparatus comprises a set of memory cells arranged in a plurality of blocks, the plurality of blocks comprising a first set of blocks and a second set of blocks; and a control circuit configured to store data in the first set of blocks in an M bit per cell mode, store data in the second set of blocks in the M bit per cell mode at some times and in an N bit per cell mode at other times, where M<N, maintain a respective count of M bit per cell program-erase cycles of each block of the second set of blocks, and select a block of the second set of blocks to transition from the N bit per cell mode to the M bit per cell mode based on its respective count of M bit per cell program-erase cycles.

In another implementation, an apparatus comprises: a set of memory cells arranged in a plurality of blocks, the plurality of blocks comprising a first set of blocks and a second set of blocks; and a control circuit. The control circuit is configured to: store data in the first set of blocks in an M bit per cell mode; repeatedly transition blocks in the second set of blocks between storing data in the M bit per cell mode and storing data in an N bit per cell mode, where M<N; maintain a respective count of M bit per cell program-erase cycles of each block of the second set of blocks; maintain a respective count of N bit per cell program-erase cycles of each block of the second set of blocks; and keep the respective counts of M bit per cell program-erase cycles of the second set of blocks uniform within a first tolerance, and keep the respective counts of N bit per cell program-erase cycles of the second set of blocks uniform within a second tolerance, during the repeated transition of the blocks in the second set of blocks.

The foregoing detailed description of the invention has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. An apparatus, comprising:
a control circuit connected to a set of memory cells arranged in a plurality of blocks in a memory product, the memory product having a product endurance requirement of a number X of program-erase cycles in an N bit per cell mode, the plurality of blocks comprising a set of single-mode blocks and a set of multi-mode blocks, the set of multi-mode blocks having a memory endurance of a number Y program-erase cycles in the N bit per cell mode, where Y>X, the memory endurance is a maximum number of program-erase cycles in which the multi-mode blocks are expected to operate without uncorrectable read errors in the N bit per cell mode, the control circuit is configured to:
store data in the set of single-mode blocks in an M bit per cell mode;
store data in the set of multi-mode blocks in the N bit per cell mode for the number X of program-erase cycles at some times and in an M bit per cell mode for a number of program-erase cycles which is equal to at least Y−X at other times, where M<N;
maintain a respective count of N bit per cell program-erase cycles of each block of the set of multi-mode blocks;
maintain a respective count of M bit per cell program-erase cycles of each block of the set of multi-mode blocks; and
select a block of the set of multi-mode blocks to transition from the N bit per cell mode to the M bit per cell mode based on its respective count of N bit per cell program-erase cycles;
the selected block is selected among the set of multi-mode blocks to transition from the N bit per cell mode to the M bit per cell mode based on its respective count of M bit per cell program-erase cycles being lower than respective counts of M bit per cell program-erase cycles of other blocks in the set of multi-mode blocks.

2. The apparatus of claim 1, wherein:
the control circuit is configured to keep the respective counts of M bit per cell program-erase cycles of the set of multi-mode blocks uniform within a first tolerance, and keep the respective counts of N bit per cell program-erase cycles of the set of multi-mode blocks uniform within a second tolerance, as blocks in the set of multi-mode blocks repeatedly transition between the N bit per cell mode and the M bit per cell mode.

3. The apparatus of claim 1, wherein:
the selected block of the set of multi-mode blocks transitions from the N bit per cell mode to the M bit per cell mode a single time in a lifetime of the selected block and remains in the M bit per cell mode in a remainder of its lifetime.

4. The apparatus of claim 1, wherein:
the selected block is selected among the set of multi-mode blocks to transition from the N bit per cell mode to the M bit per cell mode based on its respective count of N bit per cell program-erase cycles being lower than respective counts of N bit per cell program-erase cycles of other blocks in the set of multi-mode blocks.

5. The apparatus of claim 1, wherein the control circuit is configured to:
select a block to program among the set of multi-mode blocks based on its respective count of N bit per cell program-erase cycles being equal to respective counts of N bit per cell program-erase cycles of other blocks in the set of multi-mode blocks and its respective count of M bit per cell program-erase cycles being lower than respective counts of M bit per cell program-erase cycles of other blocks in the set of multi-mode blocks.

6. The apparatus of claim 1, wherein the control circuit is configured to:
maintain a respective count of program-erase cycles of each block of the set of single-mode blocks, wherein the selected block in the set of multi-mode blocks is selected to program in the M bit per cell mode instead of a block in the set of single-mode blocks based on the respective count of M bit per cell program-erase cycles of the selected block in the set of multi-mode blocks being lower than the respective count of program-erase cycles of the block of the set of single-mode blocks.

7. The apparatus of claim 1, wherein:
the selected block is selected among the set of multi-mode blocks to transition from the N bit per cell mode to the M bit per cell mode based on its respective count of M bit per cell program-erase cycles being equal to respective counts of M bit per cell program-erase cycles of other blocks in the set of multi-mode blocks and its respective count of N bit per cell program-erase cycles being lower than respective counts of N bit per cell program-erase cycles of other blocks in the set of multi-mode blocks.

8. The apparatus of claim 1, wherein the control circuit is configured to, for each block of the set of multi-mode blocks:
increment the respective count of M bit per cell program-erase cycles by a first amount for each M bit per cell program-erase cycle; and
increment the respective count of N bit per cell program-erase cycles by a second amount for each N bit per cell program-erase cycle, wherein:
the first amount is less than the second amount;
the first amount varies according to an amount of damage to the memory cells of the set of multi-mode blocks which becomes progressively larger over their lifetime;
the second amount varies according to an amount of damage to the memory cells of the set of multi-mode blocks which becomes progressively larger over their lifetime; and
the selected block is selected among the set of multi-mode blocks to transition from the N bit per cell mode to the M bit per cell mode based on its respective count of N bit per cell program-erase cycles and its respective count of M bit per cell program-erase cycles.

9. The apparatus of claim 8, wherein the control circuit is configured to:
retire each block in the set of multi-mode blocks based on a sum of its respective count of M bit per cell program-erase cycles and its respective count of N bit per cell program-erase cycles.

10. The apparatus of claim 1, wherein:
the selected block of the set of multi-mode blocks remains in the M bit per cell mode for a predetermined number of multiple M bit per cell program-erase cycles.

11. The apparatus of claim 1, wherein:
a number of blocks of the set of multi-mode blocks which are in the M bit per cell mode is fixed throughout a lifetime of the plurality of blocks as different blocks of the set of multi-mode blocks transition from the M bit per cell mode to the N bit per cell mode and from the N bit per cell mode to the M bit per cell mode.

12. The apparatus of claim 1, wherein:
the number of program-erase cycles in which the control circuit is configured to store data in the M bits per cell mode in the set of multi-mode blocks is based on translating the number Y−X according to an amount of deterioration of the memory cells in the set of multi-mode blocks due to a program-erase cycle in the N bit per cell mode and a lesser amount of deterioration of the memory cells in the set of multi-mode blocks due to a program-erase cycle in the M bit per cell mode.

13. The apparatus of claim 1, wherein:
the control circuit is configured to store data in the M bit per cell mode in a fixed number of multi-mode blocks in the set of multi-mode blocks throughout a lifetime of the set of memory cells.

14. A method, comprising:
programming and erasing data in a set of single-mode blocks in an M bit per cell mode;
programming and erasing data in a set of multi-mode blocks in an N bit per cell mode;
transitioning blocks in the set of multi-mode blocks to the M bit per cell mode from the N bit per cell mode, where M<N; and
maintaining a first respective count of program-erase cycles for each block of the set of multi-mode blocks in the M bit per cell mode;
maintaining a second respective count of program-erase cycles for each block of the set of multi-mode blocks in the N bit per cell mode;
incrementing the first respective count by a first amount when data is programmed and erased in the block in the M bit per cell mode; and
incrementing the second respective count by a second amount, which is greater than the first amount, when data is programmed and erased in the block in the N bit per cell mode, wherein:
the first amount varies according to an amount of damage to memory cells of the set of multi-mode blocks which becomes progressively larger over their lifetime; and
the second amount varies according to an amount of damage to memory cells of the set of multi-mode blocks which becomes progressively larger over their lifetime.

15. The method of claim 14, further comprising:
retiring each block in the set of multi-mode blocks when the respective count of program-erase cycles reaches a threshold.

16. The method of claim 14, wherein:
each block of the set of multi-mode blocks operates in the N bit per cell mode until its respective count of program-erase cycles reaches a threshold, after which each block of the set of multi-mode blocks transitions to the M bit per cell mode; and
after transitioning to the M bit per cell mode from the N bit per cell mode, each block of the set of multi-mode blocks remains in the M bit per cell mode in a remainder of its lifetime.

17. The method of claim 14, wherein:
each block of the set of multi-mode blocks transitions repeatedly between the N bit per cell mode and the M bit per cell mode based on its respective count of program-erase cycles.

18. An apparatus, comprising:
a set of memory cells arranged in a plurality of blocks in a memory product, the memory product having a product endurance requirement of a number X of program-erase cycles in an N bit per cell mode, the plurality of blocks comprising a set of single-mode blocks and a second set of multi-mode blocks, the set of multi-mode blocks having a memory endurance of a number Y program-erase cycles in the N bit per cell mode, where Y>X, the memory endurance is a maximum number of program-erase cycles in which the multi-mode blocks are expected to operate without uncorrectable read errors in the N bit per cell mode; and
a control circuit, the control circuit is configured to:
store data in the set of single mode blocks in an M bit per cell mode;
store data in the set of multi-mode blocks in the N bit per cell mode for the number X of program-erase cycles at some times and in an M bit per cell mode for a number of program-erase cycles which is equal to at least Y−X at other times, where M<N;
maintain a respective count of M bit per cell program-erase cycles of each block of the set of multi-mode blocks;
maintain a respective count of N bit per cell program-erase cycles of each block of the set of multi-mode blocks; and
select a block of the set of multi-mode blocks to transition from the N bit per cell mode to the M bit per cell mode based on its respective count of N bit per cell program-erase cycles;
the selected block is selected among the set of multi-mode blocks to transition from the N bit per cell mode to the M bit per cell mode based on its respective count of M bit per cell program-erase cycles being lower than respective counts of M bit per cell program-erase cycles of other blocks in the set of multi-mode blocks.

19. The apparatus of claim 18, wherein:
each block of the set of multi-mode blocks remains in the M bit per cell mode for a plurality of M bit per cell program-erase cycles before transitioning from the M bit per cell mode to the N bit per cell mode.

* * * * *